(12) United States Patent
Kataoka et al.

(10) Patent No.: US 10,638,869 B2
(45) Date of Patent: May 5, 2020

(54) HEATING COOKER

(71) Applicant: Panasonic Intellectual Property Management Co., Ltd., Osaka-shi, Osaka (JP)

(72) Inventors: Akira Kataoka, Shiga (JP); Masaki Shibuya, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 204 days.

(21) Appl. No.: 15/537,124

(22) PCT Filed: Jun. 6, 2016

(86) PCT No.: PCT/JP2016/002712
§ 371 (c)(1),
(2) Date: Jun. 16, 2017

(87) PCT Pub. No.: WO2016/199392
PCT Pub. Date: Dec. 15, 2016

(65) Prior Publication Data
US 2018/0263401 A1  Sep. 20, 2018

(30) Foreign Application Priority Data

Jun. 12, 2015 (JP) .................. 2015-118819

(51) Int. Cl.
*F24D 1/00* (2006.01)
*A47J 27/04* (2006.01)
(Continued)

(52) U.S. Cl.
CPC ............... *A47J 27/04* (2013.01); *A23B 4/07* (2013.01); *A23L 3/365* (2013.01); *A23L 5/13* (2016.08);
(Continued)

(58) Field of Classification Search
None
See application file for complete search history.

(56) References Cited

U.S. PATENT DOCUMENTS

2002/0178932 A1* 12/2002 Cai .................. A47J 27/04
                                          99/516
2007/0215142 A1*  9/2007 Uchiyama ........... F24C 1/04
                                          126/369
(Continued)

FOREIGN PATENT DOCUMENTS

| CN | 1950644 A       |   | 4/2007 |
|----|-----------------|---|--------|
| CN | 201377886 Y     | * | 1/2010 |
| JP | 2006-038315     |   | 2/2006 |

OTHER PUBLICATIONS

International Search Report of PCT application No. PCT/JP2016/002712 dated Jul. 26, 2016, 3 pages.
(Continued)

*Primary Examiner* — Jason Lau
(74) *Attorney, Agent, or Firm* — Brinks Gilson & Lione

(57) ABSTRACT

By preheating temperature raising unit of a steam and hot water generating device beforehand to a predetermined temperature, and supplying water in an amount equal to or more than predetermined amount V (per unit time) to the temperature raising unit, a large amount of steam is instantaneously generated. At this time, hot water adhered to the temperature raising unit rises along with the steam, and the steam and hot water flowed through a steam hole, a relay tube, and a steam chamber are caused to eject instantaneously with accumulated steam pressure from a steam and hot water discharging port. The steam and hot water then hit and heat food products accommodated in a cooking chamber. Thus, a heating cooker capable of promptly heating a food product with steam can be provided.

5 Claims, 16 Drawing Sheets

(51) Int. Cl.

| | |
|---|---|
| *A23B 4/07* | (2006.01) |
| *A23L 5/10* | (2016.01) |
| *H05B 6/64* | (2006.01) |
| *F24C 15/00* | (2006.01) |
| *F24C 7/08* | (2006.01) |
| *A23L 3/365* | (2006.01) |
| *A47J 27/00* | (2006.01) |
| *A47J 27/21* | (2006.01) |
| *A47J 36/00* | (2006.01) |

(52) U.S. Cl.
CPC ....... *A47J 27/004* (2013.01); *A47J 27/21083* (2013.01); *A47J 36/00* (2013.01); *F24C 7/085* (2013.01); *F24C 7/087* (2013.01); *F24C 15/003* (2013.01); *H05B 6/6479* (2013.01); *A23V 2002/00* (2013.01); *A47J 2027/043* (2013.01); *A47J 2202/00* (2013.01)

(56) References Cited

U.S. PATENT DOCUMENTS

2010/0151092 A1* 6/2010 Sus .................. A47J 29/02
426/231
2013/0280394 A1* 10/2013 Ewald .................. A47J 39/00
426/392

OTHER PUBLICATIONS

English Translation of Chinese Search Report dated Aug. 8, 2018 for the related Chinese Patent Application No. 201680007329.8.

* cited by examiner

HEATING COOKER

RELATED APPLICATIONS

This application is a 371 application of PCT/JP2016/002712 having an international filing date of Jun. 6, 2016, which claims priority to JP 2015-118819 filed Jun. 12, 2015, the entire contents of which are incorporated herein by reference.

TECHNICAL FIELD

The present invention relates to a heating cooker capable of promptly heating a food product with steam.

BACKGROUND ART

A conventional heating cooker having a steam generator for cooking food with steam has been proposed (for example, see PTL 1).

However, the steam generator of the conventional heating cooker has been configured to have only a steam generating function. Therefore, reduction in cooking time has been difficult for an object to be heated which requires a greater heating effort, such as a frozen food product.

CITATION LIST

Patent Literature

PTL 1: Unexamined Japanese Patent Publication No. 2006-38315

SUMMARY OF THE INVENTION

The present invention provides a heating cooker capable of reducing a time for heating a frozen food product which requires a greater heating effort.

In other words, the heating cooker according to the present invention includes a body, a steam and hot water discharging port provided on the body, a steam and hot water generating device for generating steam and hot water with a heat source, a water supply device for supplying water to a steam and hot water generating device, a communication channel having one end coupled with the steam and hot water generating device and another end coupled with the steam and hot water discharging port, and a control circuit for controlling operations of the heat source and the water supply device. The steam and hot water generating device includes the steam and hot water generating chamber, a temperature raising unit provided in the steam and hot water generating chamber, and a temperature detector for detecting a temperature of the temperature raising unit. The control circuit drives, based on a signal detected by the temperature detector, the heat source to preheat the temperature raising unit such that the temperature raising unit is heated to a predetermined temperature, causes the temperature raising unit to generate a mixture of steam and hot water when the water supply device supplies water in an amount equal to or more than a predetermined amount per unit time, and causes the temperature raising unit to generate only steam when the water supply device supplies water in an amount less than the predetermined amount per unit time. The control circuit then performs a control, in accordance with a state of a food product, such that a mixture of steam and hot water or only steam supplied from the steam and hot water discharging port hits and heats the food product.

According to this configuration, the temperature raising unit is preheated to the predetermined temperature. Therefore, when water is supplied to the preheated temperature raising unit, steam is instantaneously generated, and the steam is discharged from the steam and hot water generating chamber. The steam discharged and passed through the communication channel comes out of the steam and hot water discharging port, and hits the food product. Thus, the food product can be heated and cooked. At this time, when water is supplied to the temperature raising unit in an amount equal to or more than the predetermined amount (per unit time), steam and hot water that is a previous state of steam are mixed inside the steam and hot water generating chamber. A mixture of steam and hot water then receives a large amount of heat from the temperature raising unit. Thus, steam pressure in the steam and hot water generating chamber increases, and the mixture of steam and hot water vigorously ejects from the steam and hot water generating chamber. The ejected mixture of steam and hot water flows into the communication channel, comes out of the steam and hot water discharging port, and hits the food product. As a result, the food product can be effectively heated and cooked.

In other words, the heating cooker in this configuration is capable of performing heat cooking with not only steam, but also with a mixture of steam and hot water, as required.

Specifically, when an object to be heated that is a food product is in a frozen state, and requires a greater heating effort, the temperature raising unit is supplied with water in an amount equal to or more than the predetermined amount (per unit time). Then, a mixture of steam and hot water is generated, hits, and heats the food product for accelerated heat cooking. At this time, to heat the frozen food product, while hot water effectively defrosts a frozen portion, steam heats the food product. Thus, a time for heating the food product can be shortened. On the other hand, when an object to be heated that is a food product is in a refrigerated state, and requires a less heating effort, the temperature raising unit is supplied with water in an amount less than the predetermined amount (per unit time). Then, only steam is generated to hit the food product. Thus, the food product is heated with reduced wateriness. As a result, the food product can be well cooked in an improved manner.

The heating cooker according to the present invention is capable of heating a food product with steam and hot water, and thus is capable of promptly heating, in particular, a frozen food requiring a greater heating effort. In addition, by adjusting an amount of water to be supplied, heating with only steam can be achieved. In other words, by selecting a heating state in accordance with a state of a food product, cooking can be well-finished in an improved manner.

DETAILED DESCRIPTION OF THE EXEMPLARY EMBODIMENTS

Exemplary embodiments of the present invention will now be described with reference to the drawings. However, the present invention is not limited to the exemplary embodiments.

First Exemplary Embodiment

A heating cooker according to a first exemplary embodiment will now be described with reference to FIG. 1 to FIG. 5.

Figure 1:
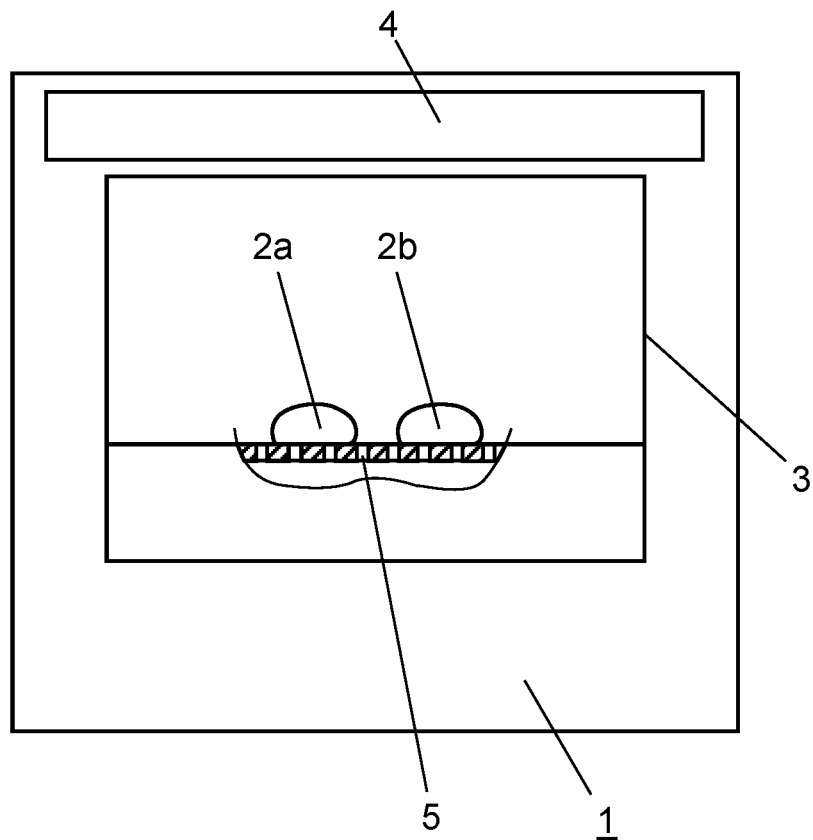
FIG. 1 is a front view of a heating cooker according to a first exemplary embodiment of the present invention.
Figure 2:
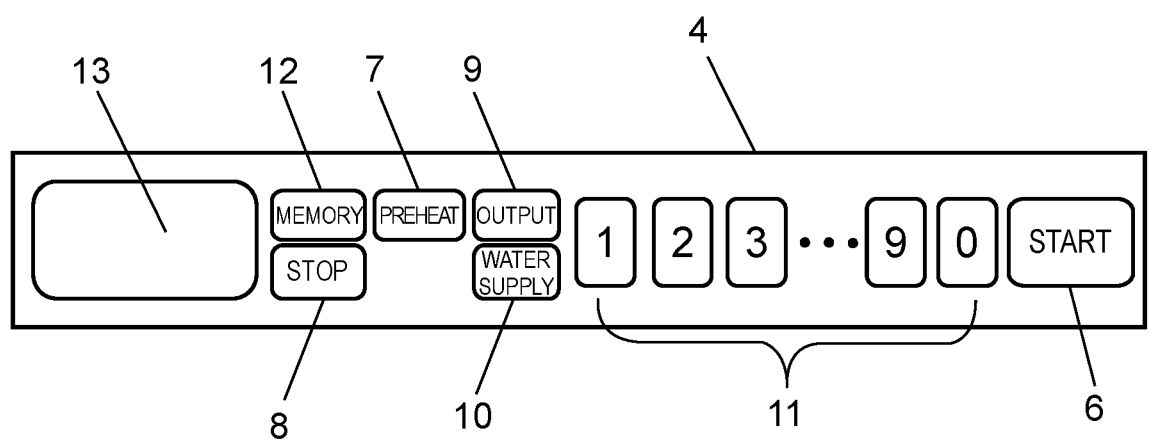
FIG. 2 is a detailed view of an operating unit of the heating cooker according to the first exemplary embodiment.
Figure 3:
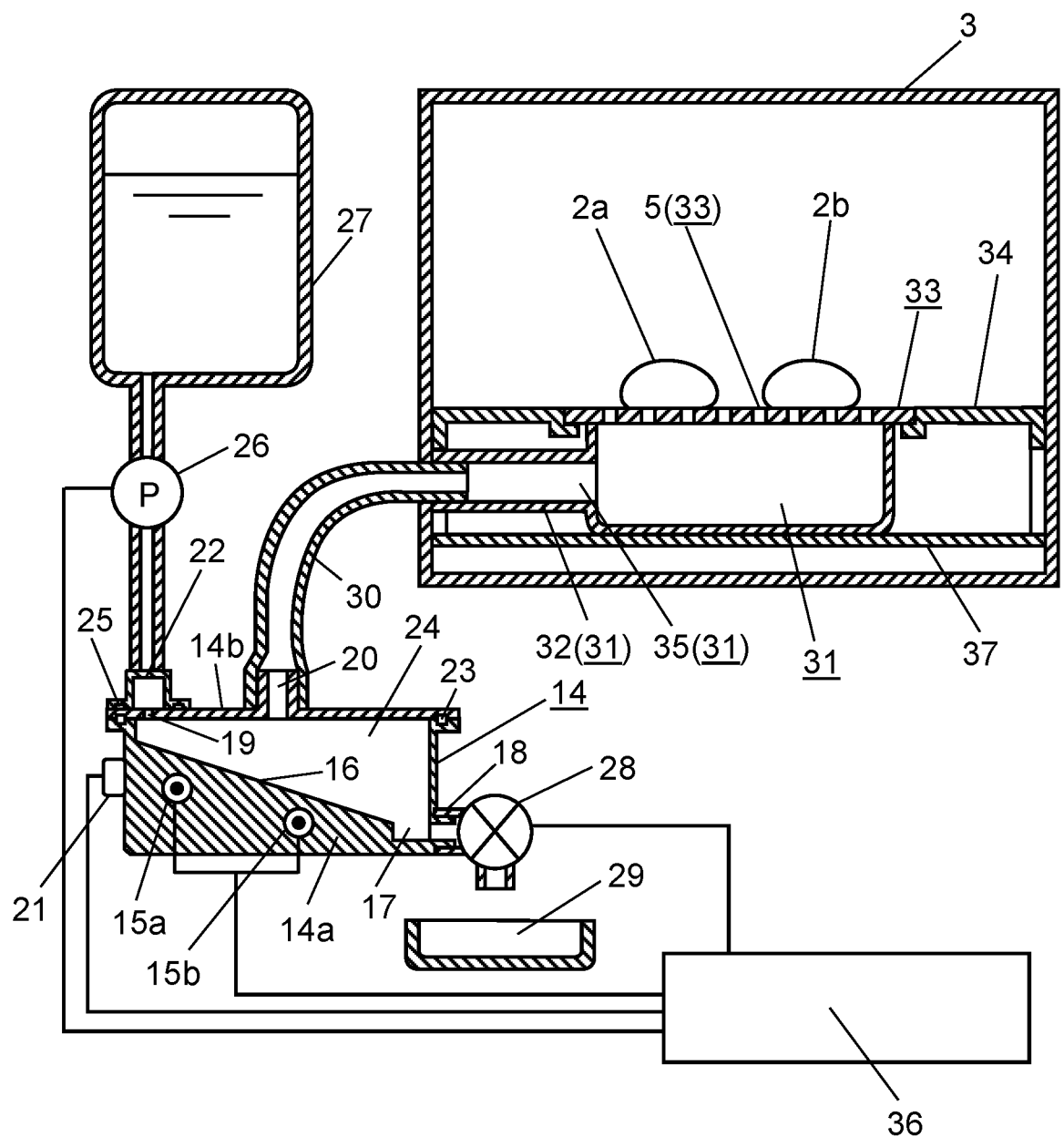
FIG. 3 is a cross-sectional view of a whole configuration of the heating cooker according to the first exemplary embodiment.
Figure 4:
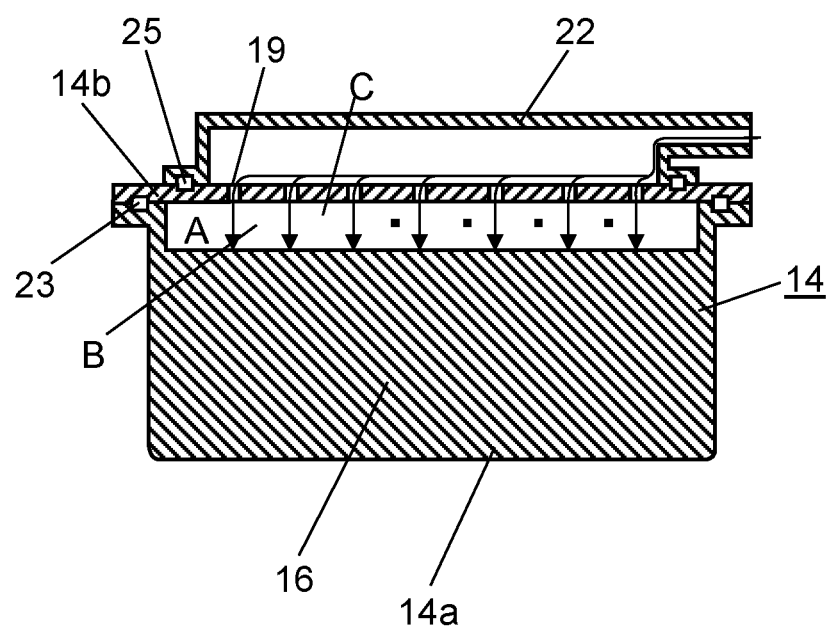
FIG. 4 is a cross-sectional view of an essential portion of a steam and hot water generating device of the heating cooker according to the first exemplary embodiment.
Figure 5:
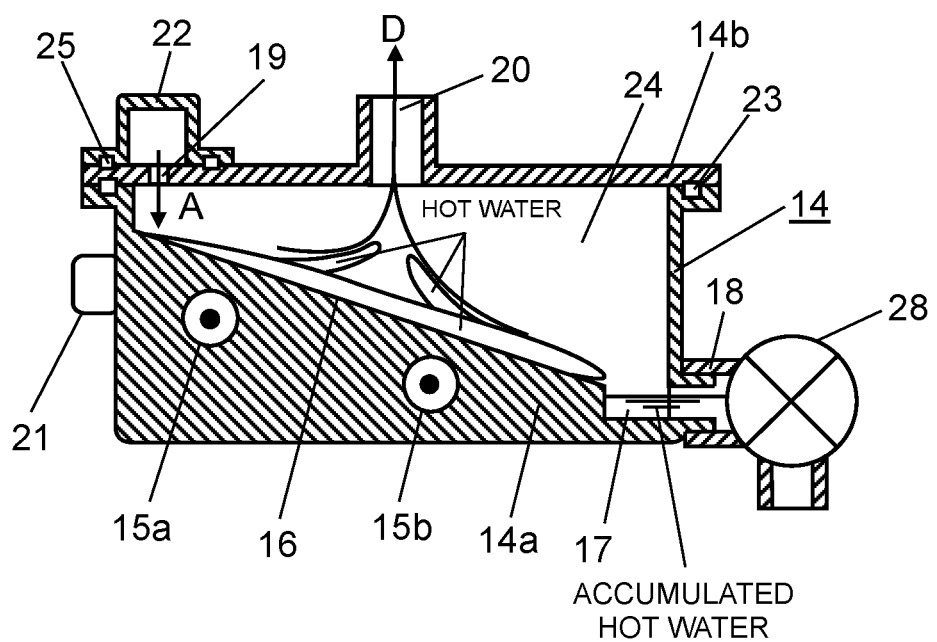
FIG. 5 is a cross-sectional view of the essential portion of the steam and hot water generating device shown in FIG. 4, when its orientation is turned 90 degrees.

FIG. 1 is a front view of the heating cooker according to the first exemplary embodiment of the present invention. FIG. 2 is a detailed view of an operating unit of the heating cooker. FIG. 3 is a cross-sectional view of a whole configuration of the heating cooker. FIG. 4 is a cross-sectional view of an essential portion of a steam and hot water generating device of the heating cooker. FIG. 5 is a cross-sectional view of the essential portion of the steam and hot water generating device of the heating cooker shown in FIG. 4, when its orientation is turned 90 degrees.

As shown in FIG. 1 to FIG. 5, the heating cooker according to this exemplary embodiment includes body 1, and operating unit 4 provided on a top of body 1. Body 1 includes therein at least cooking chamber 3, steam and hot water generating device 14, water supply device 26, water supply tank 27, control circuit 36, and the like. Cooking chamber 3 includes a door (not shown) on a front face, and accommodates, by opening and closing of the door, food products 2a, 2b that are objects to be heated, such as frozen meat buns. Accommodated food products 2a, 2b are disposed on steam and hot water discharging ports 5 provided with a plurality of small holes.

Operating unit 4 includes start key 6, preheat key 7, stop key 8, output key 9, water supply key 10, a plurality of numeric keys 11, memory key 12, display unit 13, and the like which function when operated, for example, when pressed. Start key 6 is used to start heating. Preheat key 7 is used to set whether preheating is required. Stop key 8 is used to stop heating. Output key 9 is used to select a heating state. Water supply key 10 is used to select a water supply state or a water discharge state. Numeric keys 11 are used to enter a heating time and the like. Memory key 12 is used to store a heating state. Display unit 13 is formed of, for example, a liquid crystal, and displays various states.

Steam and hot water generating device 14 includes bottom portion 14a, top portion 14b, steam and hot water generating chamber 24, reservoir 17 provided with water discharge hole 18, temperature detector 21, and the like. Bottom portion 14a is made of, for example, die-cast aluminum, and includes therein heat sources 15a, 15b formed of sheathed heaters. In addition, bottom portion 14a includes temperature raising unit 16 at an inner top. Temperature raising unit 16 is formed of an inclined plane inclining downward toward reservoir 17. At the bottom of the inclined plane, reservoir 17 is formed.

Top portion 14b is made of, for example, die-cast aluminum, and includes water supply holes 19, steam hole 20, and the like. A plurality of water supply holes 19 are provided at positions facing a vicinity of a top (apex) of the inclined plane of temperature raising unit 16. Steam hole 20 is provided at, for example, a center portion of top portion 14b to face the inclined plane of temperature raising unit 16.

Temperature detector 21 is provided on an outer wall near temperature raising unit 16 to detect a temperature of temperature raising unit 16.

Above water supply holes 19, water supply cover 22 made of a heat-resistant resin such as polyphenylene sulfide is provided. Water supply cover 22 forms a channel for supplying, with water supply device 26, water from water supply tank 27 to steam and hot water generating device 14.

In addition, the steam and hot water generating device 14 includes annular main packing 23 made of, for example, silicone rubber between bottom portion 14a and top portion 14b. Main packing 23 prevents leakage of steam and hot water. Furthermore, an internal space is formed between bottom portion 14a and top portion 14b. The space forms steam and hot water generating chamber 24.

Furthermore, between top portion 14b of the steam and hot water generating device 14 and water supply cover 22, annular auxiliary packing 25 made of, for example, silicone rubber is provided. Auxiliary packing 25 prevents leakage of water supplied from water supply device 26.

Water supply device 26 includes an electric pump and the like. Water supply device 26 supplies water from water supply tank 27 provided in body 1, via water supply cover 22, to the steam and hot water generating device 14.

Water discharge valve 28 includes an electrically-driven electromagnetic valve and the like. Water discharge valve 28 controls discharging of water from water discharge hole 18. Water discharged from water discharge hole 18 is received by and stored in water discharge tray 29 disposed in body 1.

Steam hole 20 on top portion 14b is attached with an end of relay tube 30 made of, for example, silicone rubber. Another end of relay tube 30 is attached to a side wall of cooking chamber 3, and inwardly protrudes into cooking chamber 3.

Cooking chamber 3 includes therein steam chamber 31 having steam introduction channel 32, opening plate 33, loading table 34, cooking chamber bottom plate 37, and the like. Relay tube 30 fits to steam introduction channel 32 of steam chamber 31 provided on cooking chamber bottom plate 37 of cooking chamber 3.

Opening plate 33 is provided on steam chamber 31, opening plate 33 having steam and hot water discharging ports 5 and being supported by loading table 34. Loading table 34 includes an opening at its center, and a peripheral edge of the opening supports opening plate 33. Steam chamber 31, opening plate 33, and loading table 34 are made of, for example, a polypropylene resin that withstands a temperature of steam.

Relay tube 30 and steam chamber 31 constitute communication channel 35. Communication channel 35 supplies steam and hot water generated by steam and hot water generating chamber 24 to steam and hot water discharging ports 5 of opening plate 33. Thus, an object to be heated such as food products 2a, 2b accommodated in cooking chamber 3 is heated.

Control circuit 36 is electrically coupled with heat source 15a, heat source 15b, temperature detector 21, water supply device 26, water discharge valve 28, and the like to control each of a series of operations.

Cooking chamber bottom plate 37 is made of, for example, heat-resistant glass such as crystallized glass, and is fixed inside cooking chamber 3 near a bottom of cooking chamber 3. On cooking chamber bottom plate 37, steam chamber 31, loading table 34, and the like are disposed.

The heating cooker according to this exemplary embodiment is configured as described above.

An operation and an effect of the heating cooker configured as described above will now be described with reference to FIG. 1 to FIG. 5 and using FIG. 6 to FIG. 11.

Figure 6:
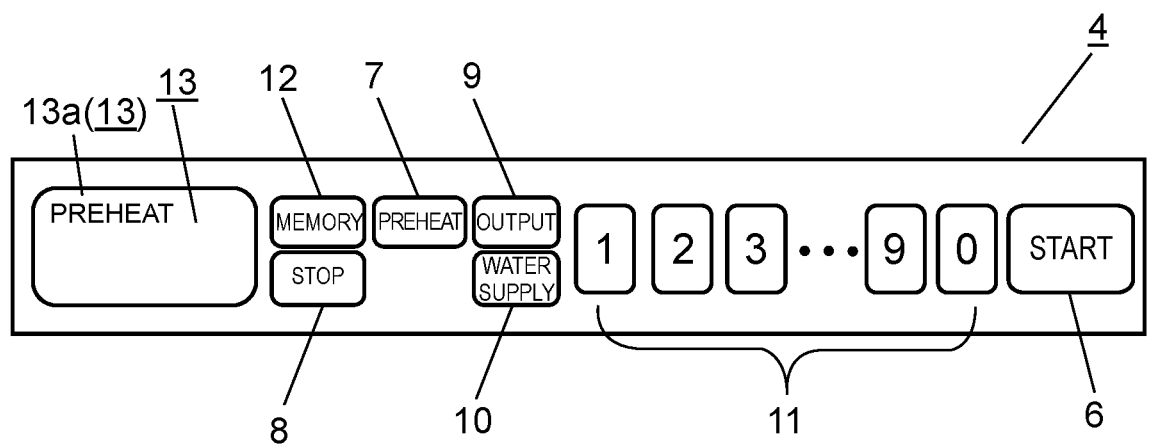
FIG. 6 is a view illustrating an example display, during preheating, of the operating unit of the heating cooker according to the first exemplary embodiment.
Figure 7:
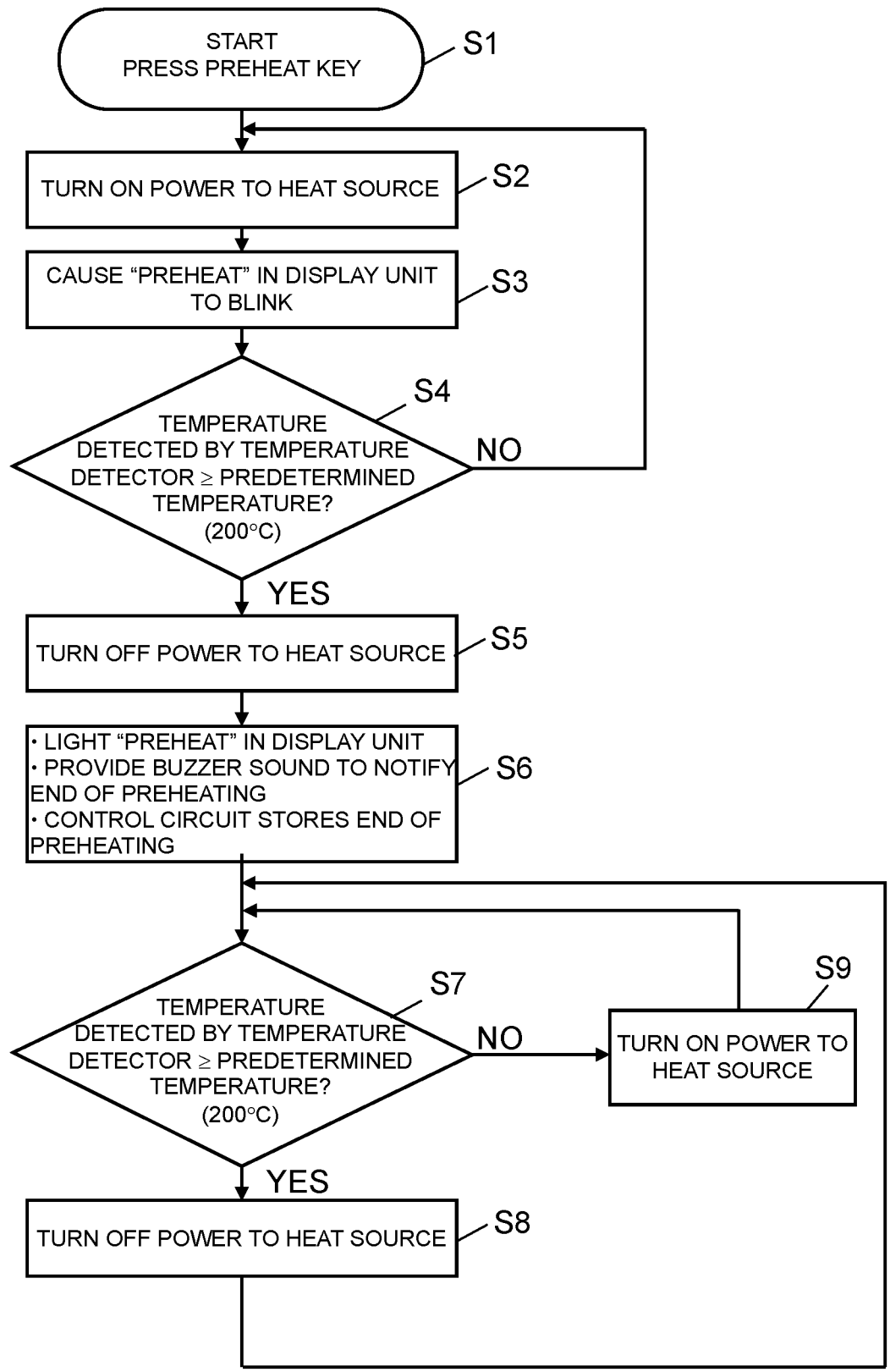
FIG. 7 is a flowchart illustrating a content of a preheating control performed by the heating cooker according to the first exemplary embodiment.
Figure 8:
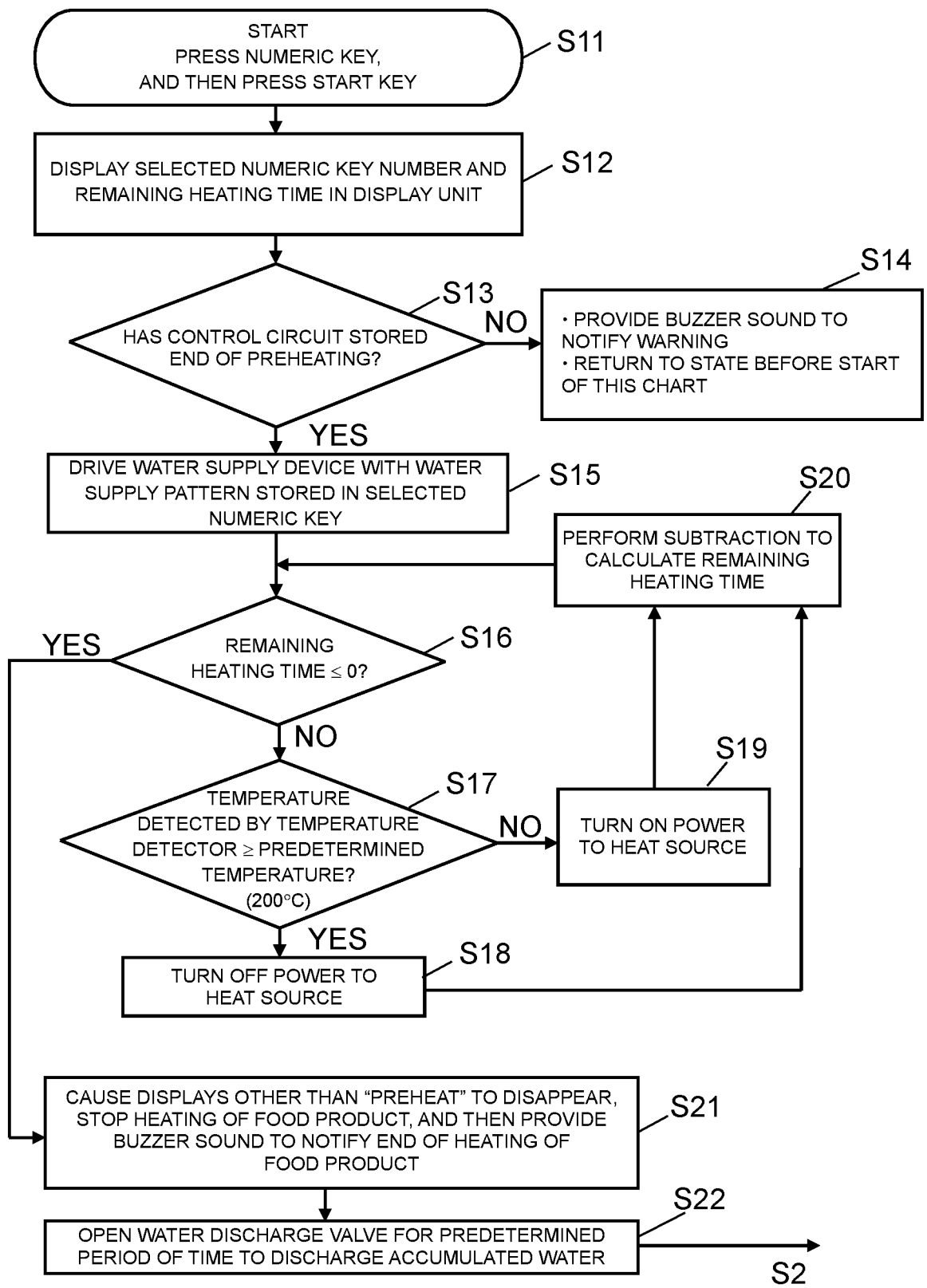
FIG. 8 is a flowchart illustrating a content of a heating control performed by the heating cooker according to the first exemplary embodiment.
Figure 9:
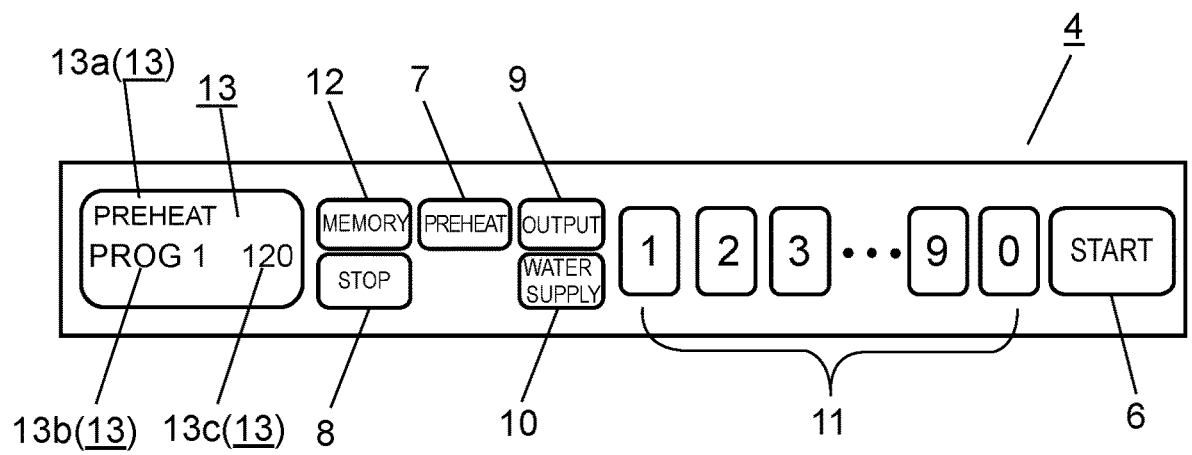
FIG. 9 is a view illustrating an example display, during heating, of the operating unit of the heating cooker according to the first exemplary embodiment.
Figure 10:
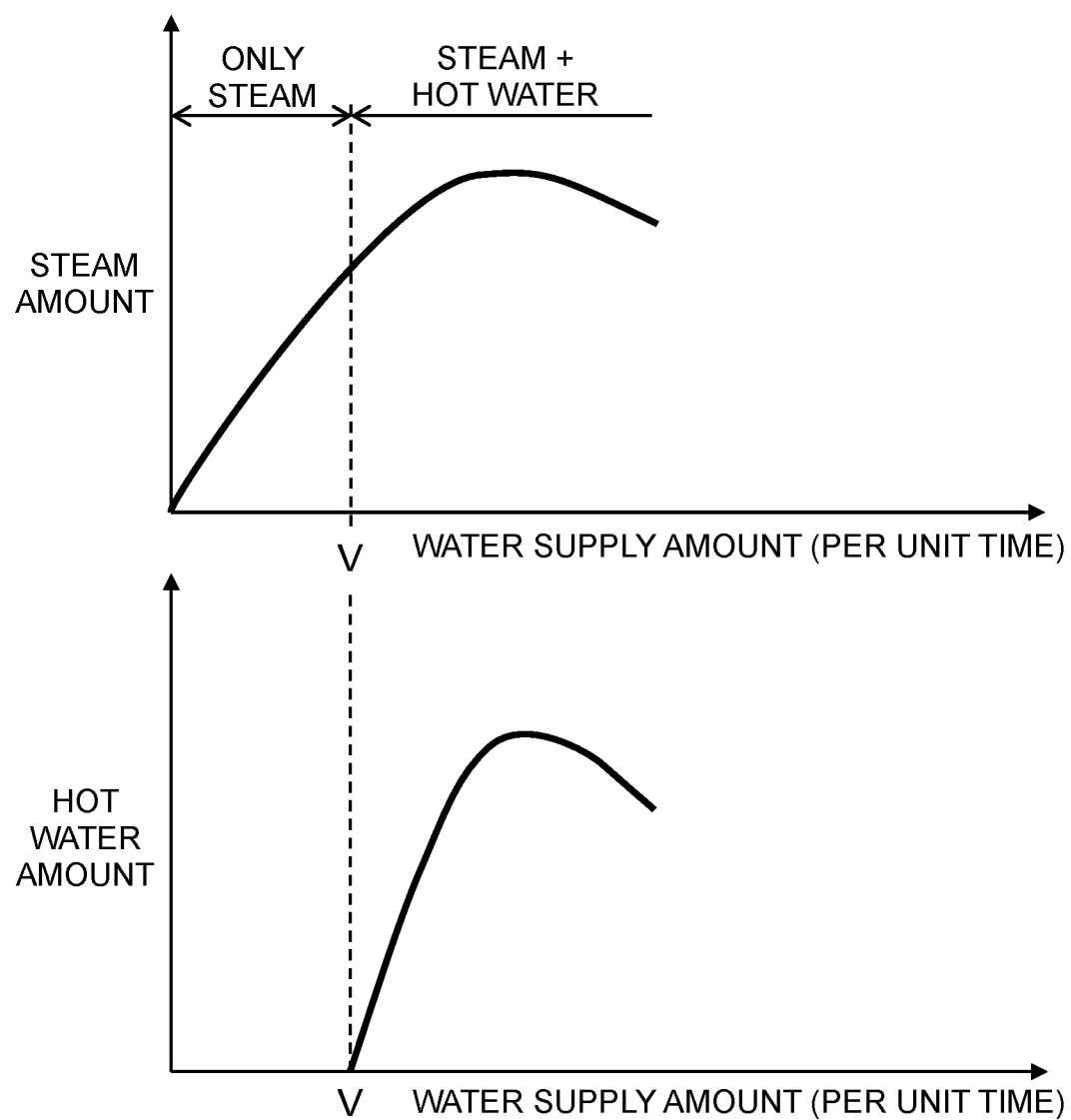
FIG. 10 shows graphs illustrating water supply amounts and states of steam and hot water generated in the heating cooker according to the first exemplary embodiment.
Figure 11:
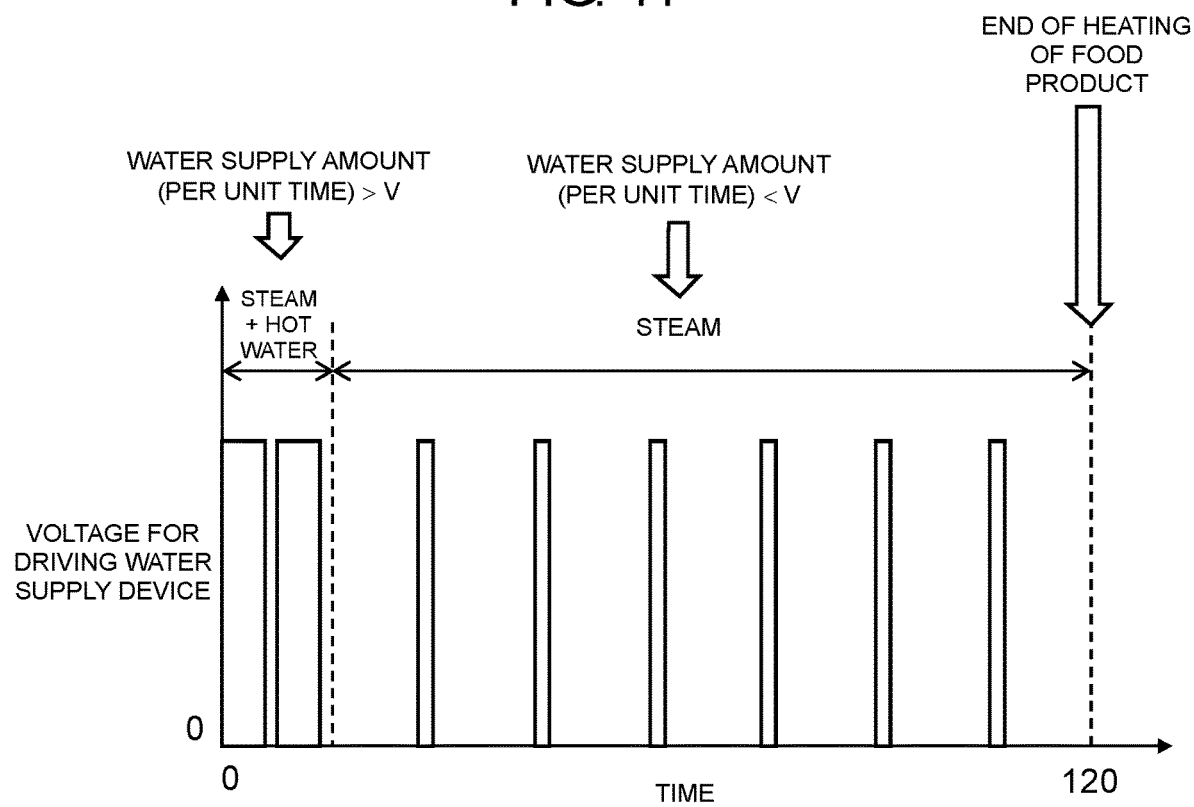
FIG. 11 shows a graph illustrating a water supply pattern for use in the heating cooker according to the first exemplary embodiment.

FIG. 6 is a view illustrating an example display, during preheating, of the operating unit of the heating cooker. FIG. 7 is a flowchart illustrating a content of a preheating control performed by the heating cooker. FIG. 8 is a flowchart illustrating a content of a heating control performed by the heating cooker. FIG. 9 is a view illustrating an example display, during heating, of the operating unit of the heating cooker. FIG. 10 shows graphs illustrating water supply amounts and states of steam and hot water generated by the heating cooker. FIG. 11 shows a graph illustrating a water supply pattern for use in the heating cooker.

As shown in FIG. 7, firstly, when a user presses preheat key 7 on operating unit 4, control circuit 36 causes the heating cooker to start heating (step S1). Specifically, control circuit 36 turns on power to heat sources 15a, 15b (step S2). Control circuit 36 then causes display 13a of "PREHEAT" to blink in display unit 13 of operating unit 4 as shown in FIG. 6 (step S3).

Next, control circuit 36 determines, using temperature detector 21, whether a temperature of temperature raising unit 16 of steam and hot water generating device 14 is equal to or higher than a predetermined temperature (for example, 200° C.) (step S4). At this time, when a temperature detected by temperature detector 21 is lower than the predetermined temperature (NO in step S4), control circuit 36 keeps power to heat sources 15a, 15b until the predetermined temperature is attained.

On the other hand, when the temperature detected by temperature detector 21 is equal to or higher than the predetermined temperature (YES in step S4), control circuit 36 turns off power to heat sources 15a, 15b to once stop heating (step S5).

Next, control circuit 36 stops the blinking of display 13a of "PREHEAT" in display unit 13, and lights display 13a of "PREHEAT". Furthermore, control circuit 36 provides a buzzer sound representing end of preheating to notify the end of preheating to the user, and stores the end of preheating (step S6).

Control circuit 36 then determines again whether a temperature detected by temperature detector 21 is equal to or higher than the predetermined temperature (for example, 200° C.) (step S7). At this time, when the detected temperature is lower than the predetermined temperature (NO in step S7), control circuit 36 turns on power to heat sources 15a, 15b (step S9). Until a detected temperature reaches the predetermined temperature, control circuit 36 repeats processes of step S7 and step S9.

On the other hand, when the temperature detected by temperature detector 21 reaches the predetermined temperature (YES in step S7), control circuit 36 turns off power to heat sources 15a, 15b (step S8). Until a temperature becomes lower than the predetermined temperature, control circuit 36 repeats processes of step S7 and step S8. In other words, the heating cooker repeats operations of the power off (step S8) and the power on (step S9) described above. Thus, a temperature of temperature raising unit 16 of steam and hot water generating device 14 can be maintained around the predetermined temperature.

Next, while a temperature of temperature raising unit 16 is maintained around the predetermined temperature, the user opens the door (not shown) of cooking chamber 3 to dispose, as shown in FIG. 3, food products 2a, 2b on steam and hot water discharging ports 5 of opening plate 33.

Next, in accordance with the flowchart shown in FIG. 8, for example, the heating cooker starts heating of food products 2a, 2b accommodated in cooking chamber 3. A description with reference to FIG. 8 is given based on an assumption that temperature raising unit 16 has already been preheated.

Specifically, as shown in FIG. 8, firstly, the user presses one of numeric keys 11 each storing a heating pattern, which is appropriate for heating of food products 2a, 2b. The user then presses start key 6 (step S11). Thus, a heating operation for food products 2a, 2b starts.

In this exemplary embodiment, a case where food products 2a, 2b are frozen meat buns will be described.

Therefore, the user presses one of numeric keys 11, for example, number "1", in which a heating pattern appropriate for meat buns is stored. Thus, control circuit 36 causes display unit 13 of operating unit 4 to display the selected numeric key that is number "1," and a remaining time required for heating (step S12).

Next, control circuit 36 determines whether end of preheating of temperature raising unit 16 has been stored (step S13). At this time, if end of preheating is not stored (NO in step S13), even though start key 6 is pressed, no subsequent operation starts. Therefore, control circuit 36 provides a warning buzzer sound to warn the user, and ends a heating process (step S14). As described above, to store a heating pattern beforehand, memory key 12, output key 9, water supply key 10, numeric keys 11, and the like on operating unit 4 are used to store the heating pattern in a storage (not shown) of control circuit 36 with a predetermined algorithm.

In a state where temperature raising unit 16 of steam and hot water generating device 14 has been preheated, when the user presses one of numeric keys 11, for example, number "1", which is a heating pattern appropriate for food products 2a, 2b, and then presses start key 6, a heating operation starts. At this time, display unit 13 of operating unit 4 displays, as shown in FIG. 9, display 13b of "PROG 1" showing the heating pattern being operated, and display 13c of "120" showing the remaining heating time in seconds, for example.

On the other hand, when end of preheating has been stored (YES in step S13), control circuit 36 drives water supply device 26 to supply water with a water supply pattern appropriate for food products 2a, 2b (step S15).

An operation and an effect of the above water supply pattern will now be described with reference to FIG. 10 and FIG. 11.

In other words, control circuit 36 supplies water from water supply tank 27 to water supply cover 22 in accordance with a predetermined water supply pattern (see FIG. 11) corresponding to the heating pattern of the selected numeric key 11. Specifically, as shown in FIG. 4 and FIG. 5, water supplied in accordance with the predetermined water supply pattern into water supply cover 22 is delivered in a branched manner to the plurality of water supply holes 19 on top portion 14b of steam and hot water generating device 14. The delivered water is then supplied from water supply holes 19 toward a top (near apex) of an inclined plane of temperature raising unit 16 in directions indicated with arrows A, B, and C.

In this case, since temperature raising unit 16 is kept heated to a predetermined temperature (approximately 200° C.) beforehand, water supplied to temperature raising unit 16 immediately evaporates to steam. At this time, by delivering and supplying water from the plurality of water supply holes 19 downward to the inclined plane of temperature raising unit 16, the water flows, from top to bottom, on a whole surface of temperature raising unit 16. Thus, heat accumulated in temperature raising unit 16 can evenly be used for generating steam. As a result, steam can be instantaneously generated.

As shown in FIG. 10, a generation state of steam varies depending on a water supply amount per unit time (predetermined amount V). In other words, when a water supply amount is less than predetermined amount V, only steam is generated. On the other hand, when a water supply amount is equal to or more than predetermined amount V, a mixture of steam and hot water is generated. Normally, the generation state of steam and hot water varies depending on an amount of heat accumulated in temperature raising unit 16 of steam and hot water generating device 14, magnitudes of outputs from heat sources 15a, 15b, and the like. Therefore, although it is generally difficult to describe numerically, when a configuration of steam and hot water generating device 14 and a heating condition are determined, predetermined amount V can be determined.

Specifically, in a case of this exemplary embodiment, steam and hot water generating device 14 is configured such that a weight of die-cast aluminum is approximately 1 kg, and a total output of the sheathed heaters of heat sources 15a, 15b is approximately 2 kW. Thus, predetermined amount V in this exemplary embodiment can be estimated to a value in a range from approximately 0.8 mL/seconds to 1.4 mL/seconds. In particular, when predetermined amount V is set to a central value of 1.1 mL/seconds, it has been confirmed that a most stable result can be obtained.

A water supply pattern corresponding to a heating pattern of this exemplary embodiment will now be described with reference to FIG. 11.

As shown in FIG. 11, when control circuit 36 causes water supply device 26 to operate, in an initial stage of heating, water in an amount equal to or more than predetermined amount V (per unit time) is supplied to temperature raising unit 16. Thus, as shown in FIG. 5, a large amount of steam is instantaneously generated, and discharged from steam hole 20 at top portion 14b of steam and hot water generating device 14 as indicated with arrow D. At this time, hot water adhered to temperature raising unit 16 also rises along with the steam. Therefore, with the steam and hot water filled internally, steam pressure in steam and hot water generating chamber 24 increases. Due to the increased steam pressure, the steam and hot water passed through steam hole 20, relay tube 30, and steam chamber 31 are instantaneously ejected from steam and hot water discharging ports 5 of opening plate 33. Thus, the ejected steam and hot water hit food products 2a, 2b to heat food products 2a, 2b.

In other words, when steam and hot water are generated, a large amount of heat accumulated in temperature raising unit 16 through preheating is transmitted to the steam and hot water. The large amount of transmitted heat is then transmitted to food products 2a, 2b. Thus, in the initial stage of heating, defrosting of still frozen food products 2a, 2b is facilitated. As a result, a time for heating food products 2a, 2b can remarkably be shortened.

At this time, moisture dropped from food products 2a, 2b and the like due to defrosting is discharged, through steam and hot water discharging ports 5, to steam chamber 31. Thus, food products 2a, 2b can be well heated in an improved manner with reduced wateriness.

On the other hand, in stages other than the initial stage of heating, as shown in FIG. 11, control circuit 36 turns on power to water supply device 26 so that water in an amount less than predetermined amount V is supplied to temperature raising unit 16. Thus, only steam generated by temperature raising unit 16 hits defrosted food products 2a, 2b. As a result, food products 2a, 2b can be further well steamed.

Food products 2a, 2b are heated as described above

Next, as shown in FIG. 8, control circuit 36 determines whether the remaining heating time is 0 (step S16). At this time, if the remaining heating time is not 0 (NO in step S16), control circuit 36 determines whether a temperature detected by temperature detector 21 is equal to or higher than a predetermined temperature (for example, 200° C.) (step S17). When the detected temperature is less than the predetermined temperature (NO in step S17), control circuit 36 turns on power to heat source 15a, 15b (step S19). Control circuit 36 then performs subtraction to calculate the remaining heating time (step S20), and executes step S16 and subsequent steps.

At this time, when the temperature detected by temperature detector 21 reaches the predetermined temperature (YES in step S17), control circuit 36 turns off power to heat sources 15a, 15b (step S18). Control circuit 36 then performs subtraction to calculate the remaining heating time (step S20).

In other words, until the remaining heating time becomes 0, the heating cooker repeats operations of the power off (step S19) and the power on (step S18) as described above, each time while performing subtraction to the remaining time (step S20). At this time, display 13c of operating unit 4 displays the remaining time obtained through subtraction, as the heating time passes by. When the remaining heating time becomes 0 (YES in step S16), control circuit 36 then causes display 13b of "PROG 1" and display 13c of the remaining heating time, other than display 13a of preheat, to disappear from display unit 13. Simultaneously, control circuit 36 ends heating of food products 2a, 2b, and provides a buzzer sound to notify end of heating of the food products (step S21). Thus, control circuit 36 notifies to the user that food products 2a, 2b have been heated.

Normally, after food products 2a, 2b have been heated, temperature raising unit 16 of steam and hot water generating device 14 is kept preheated to the predetermined temperature (approximately 200° C.) for next food products 2a, 2b heating.

In step S21, after food products 2a, 2b have been heated, control circuit 36 causes water discharge valve 28 to open for a predetermined period of time to discharge hot water accumulated, during heating, in reservoir 17 (step S22). Water discharge valve 28 should be open only for a predetermined period of time after food products 2a, 2b have been heated. Therefore, except for the above period of time, water discharge valve 28 is always closed. At this time, if water to be used contains scale components, the scale components will condense into and drain away together with water accumulated in reservoir 17. Thus, scale components are less likely to accumulate in steam and hot water generating chamber 24. As a result, water discharge hole 18 can be prevented from clogging, and the inside of steam and hot water generating chamber 24 can be kept clean. Steam chamber 31, opening plate 33, and loading table 34 are detachably disposed in cooking chamber 3. Therefore, at the time of maintenance, steam chamber 31, opening plate 33, and loading table 34 can be removed for cleaning.

Next, when water has been discharged in step S22, the process returns to step S2 for preheating, and waits for next food products 2a, 2b heating.

At this time, in order to end preheating at the time when the water has been discharged in step S22, a user presses preheat key 7 on operating unit 4, and then immediately press (for example, within two seconds) the stop key. Thus, display 13a of "PREHEAT" disappears from display unit 13 of operating unit 4, and preheating stops.

As described above, based on a predetermined water supply pattern, corresponding food products 2a, 2b heating can be executed.

Second Exemplary Embodiment

A heating cooker according to a second exemplary embodiment will now be described with reference to FIG. 12, FIG. 17, and FIG. 18.

Figure 12:
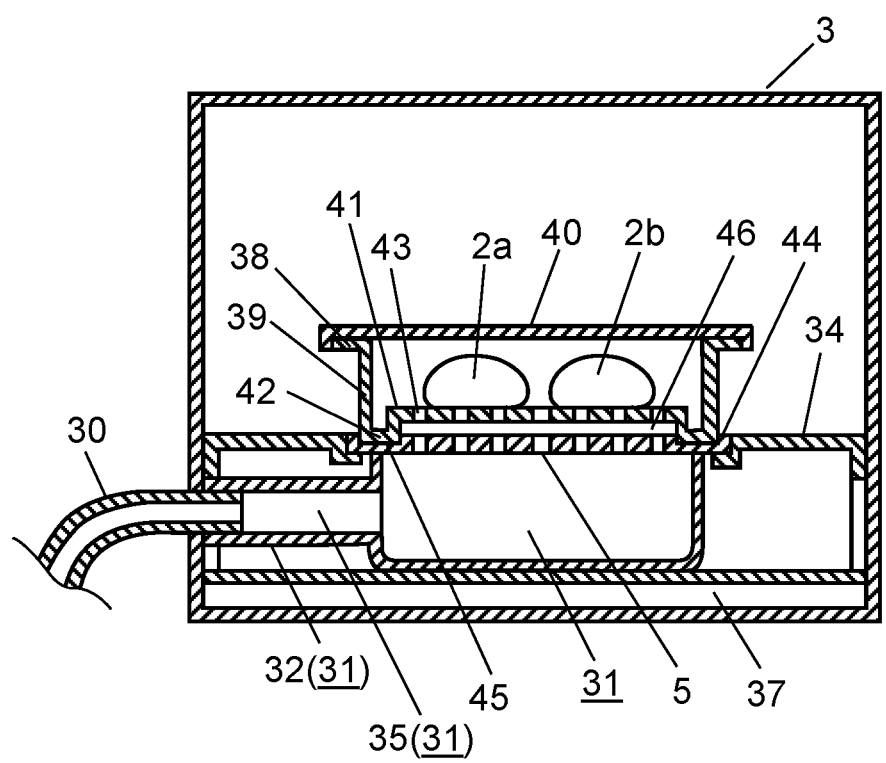
FIG. 12 is a cross-sectional view of an essential portion of a heating cooker according to a second exemplary embodiment of the present invention.

FIG. 12 is a cross-sectional view of an essential portion of the heating cooker according to the second exemplary embodiment of the present invention. FIG. 17 is a cross-sectional view of an essential portion, when viewed from top, of a food container body of the heating cooker. FIG. 18 is a cross-sectional view of an essential portion, when viewed from top, of a steam chamber of the heating cooker.

Figure 17:
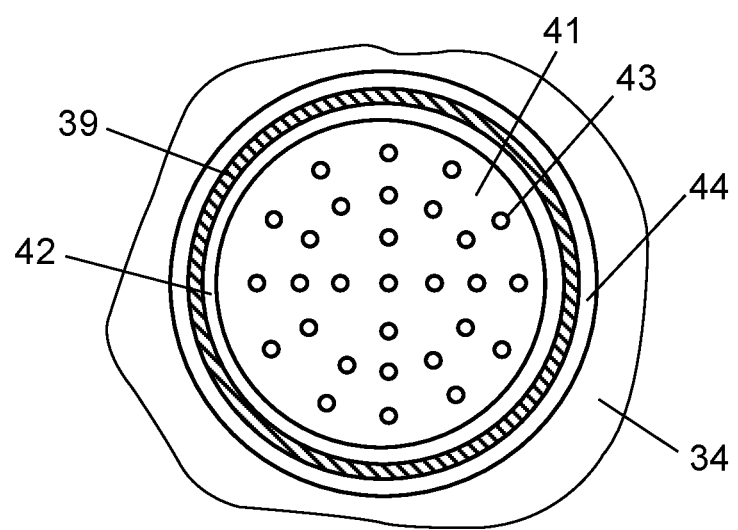
FIG. 17 is a cross-sectional view of an essential portion, when viewed from top, of a food container body of the heating cooker according to the second exemplary embodiment of the present invention.
Figure 18:
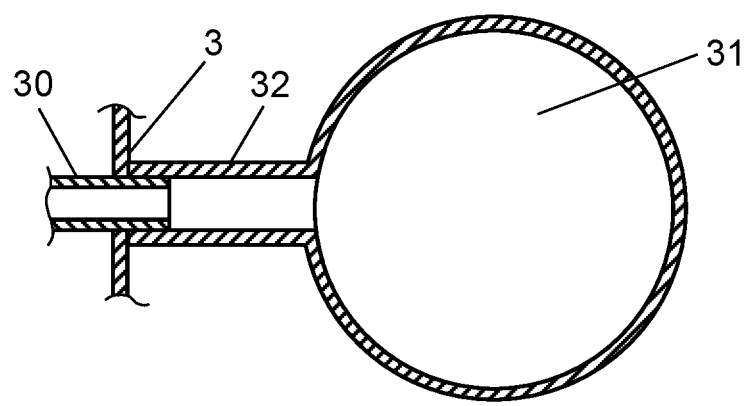
FIG. 18 is a cross-sectional view of an essential portion, when viewed from top, of a steam chamber of the heating cooker according to the second exemplary embodiment of the present invention.

As shown in FIG. 12, FIG. 17, and FIG. 18, the heating cooker according to this exemplary embodiment differs from the heating cooker according to the first exemplary embodiment in that food container 38 for accommodating food products 2a, 2b and the like is provided on opening plate 44 in cooking chamber 3. Since other components are similar to the components of the first exemplary embodiment, the same reference marks and the same names are used, and descriptions thereof are omitted.

In other words, as shown in FIG. 12, food container 38 according to this exemplary embodiment includes two components: food container body 39 disposed at a lower portion, and food container cover 40 disposed at an upper portion.

Food container 38 is formed in, as shown in FIG. 17, for example, a round shape in plan view. An internal bottom face of food container body 39 is formed by bottom face 41, and protrusion 42 provided on an outer circumference of bottom face 41. Bottom face 41 includes a plurality of opening holes 43 facing steam and hot water discharging ports 5 of opening plate 44. Inside food container 38, food products 2a, 2b such as frozen meat buns are accommodated beforehand. In FIG. 17, food products 2a, 2b are omitted and not shown.

Opening plate 44 is provided with a plurality of steam and hot water discharging ports 5 as described above, and recess 45 is provided on an outer circumference of opening plate 44. Recess 45 fits to protrusion 42 of food container body 39. At this time, gap 46 is formed between bottom face 41 of food container body 39 and opening plate 44.

Food container body 39 and food container cover 40 are made of, for example, a polypropylene resin that withstands a temperature of steam and the like.

In addition, as shown in FIG. 18, steam chamber 31 disposed on cooking chamber bottom plate 37 of cooking chamber 3 is formed in a round shape in plan view, in conformity to the round shape of food container 38. Similarly to the first exemplary embodiment, steam chamber 31 includes, on its side wall, steam introduction channel 32, where relay tube 30 and steam introduction channel 32 fit each other to form communication channel 35.

The heating cooker according to this exemplary embodiment is configured as described above.

An operation and an effect of the heating cooker configured as described above will now be described.

A heating operation for food products 2a, 2b in the heating cooker according to this exemplary embodiment is basically executed in a similar manner to the operation of the heating cooker according to the first exemplary embodiment. However, some points differ as described below.

In other words, in the heating cooker according to this exemplary embodiment, steam and hot water ejected from steam and hot water discharging ports 5 of opening plate 44 are once dispersed in gap 46 formed below bottom face 41 of food container 38. Therefore, even if positions of steam and hot water discharging ports 5 of opening plate 44 and positions of opening holes 43 of bottom face 41 are displaced from one another, food container 38 can be filled with steam and hot water introduced from opening holes 43 regardless of the positional displacement. Thus, food products 2a, 2b can be efficiently heated.

More specifically, in the heating cooker according to this exemplary embodiment, food container 38 has a round shape in plan view. Food container body 39 is disposed such that protrusion 42 of food container body 39 is fitted with recess 45 of opening plate 44. However, food container 38 can freely move in a circumferential direction. Therefore, a positional displacement is likely to occur between the positions of steam and hot water discharging ports 5 and the positions of opening holes 43 of food container 38. However, in gap 46 described above, steam and hot water can be dispersed. With this effect, regardless of the positional displacement, steam and hot water can be stably introduced from steam and hot water discharging ports 5, through opening holes 43, to food container 38 for uniform heating.

On the other hand, food container 38 according to this exemplary embodiment can be fixed at an installation position through fitting between protrusion 42 and recess 45. Therefore, unstable heating due to the positional displacement of food container 38 is less likely to occur. In addition, this fitting can prevent leakage of steam and hot water from gap 46 between bottom face 41 of food container body 39 and opening plate 44. As a result, heating efficiency can be increased. Furthermore, when pressure of steam filled in food container 38 is equal to or more than a certain value, steam is discharged from a gap between food container body 39 and food container cover 40. Thus, steam and hot water can be further smoothly introduced into food container 38.

In addition, steam and hot water supplied into food container 38 are used to heat food products 2a, 2b. At that time, moisture dropped from food products 2a, 2b and the like due to defrosting is discharged, through opening holes 43, to outside of food container 38. Thus, food products 2a, 2b can be well heated in an improved manner with reduced wateriness.

In addition, with food container 38 formed in a round shape in plan view, steam and hot water can be evenly filled in food container 38. Therefore, a temperature distribution of food products 2a, 2b can be improved for further uniform heating.

In addition, the heating cooker according to this exemplary embodiment is capable of heating an object to be heated such as food products 2a, 2b accommodated in food container 38. Thus, a user is able to heat a food product without directly touching the food product. Therefore, in an application of the heating cooker for food heating in a food service industry, for example, sanitary food products 2a, 2b accommodated in food container 38 can be served to a customer. As a result, for example, a heated food product can be delivered in a more convenient manner.

Third Exemplary Embodiment

A heating cooker according to a third exemplary embodiment will now be described with reference to FIG. 13.

Figure 13:
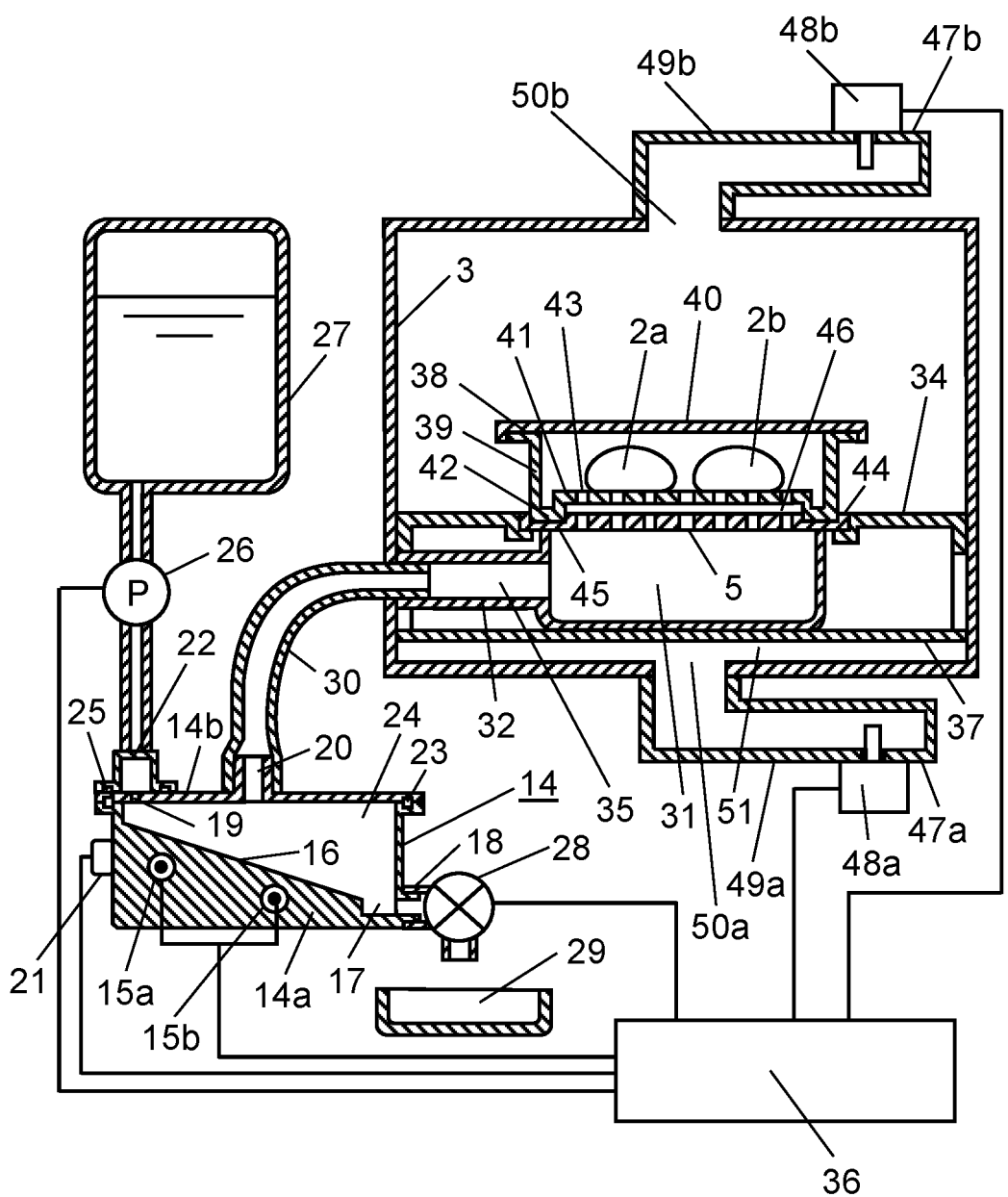
FIG. 13 is a cross-sectional view of a whole configuration of a heating cooker according to a third exemplary embodiment of the present invention.

FIG. 13 is a cross-sectional view of a whole configuration of the heating cooker according to the third exemplary embodiment of the present invention.

As shown in FIG. 13, the heating cooker according to this exemplary embodiment differs from the heating cooker according to the second exemplary embodiment in that microwave generating devices 47a, 47b are provided at a top and at a bottom of cooking chamber 3. Since other components are similar to the components of the above exemplary embodiments, the same reference symbols and the same names are used, and detailed descriptions thereof are omitted.

In other words, as shown in FIG. 13, the heating cooker according to this exemplary embodiment includes microwave generating device 47a provided at the bottom of cooking chamber 3, and microwave generating device 47b provided at the top of cooking chamber 3.

Microwave generating device 47a is provided at the bottom of cooking chamber 3, and includes magnetron 48a, wave guide 49a, and the like. Magnetron 48a generates microwaves. One end of wave guide 49a is open, but another end is closed. The other end of wave guide 49a is attached with magnetron 48a, while the one end is fixed and provided to communication hole 50a of cooking chamber 3. Wave guide 49a guides microwaves generated by magnetron 48a into cooking chamber 3 to heat food products 2a, 2b.

Communication hole 50a is in communication with space 51 located between cooking chamber bottom plate 37 and cooking chamber 3. Cooking chamber bottom plate 37 is made of, for example, microwave-transmittable crystallized glass. Thus, microwaves can be transmitted without loss into cooking chamber 3.

On the other hand, microwave generating device 47b is provided at the top of cooking chamber 3, and includes magnetron 48b, wave guide 49b, and the like. Magnetron 48b generates microwaves. One end of wave guide 49b is open, but another end is closed. The other end of wave guide 49b is attached with magnetron 48b, while the one end is fixed and provided to communication hole 50b of cooking chamber 3. Wave guide 49b guides microwaves generated by magnetron 48b into cooking chamber 3 to heat food product 2a, 2b.

At this time, antennas may be provided near communication holes 50a, 50b. Antennas are advantageous for changing a state of microwaves to be guided into cooking chamber 3, for improving a distribution of microwaves, and for effectively heating food products.

Magnetrons 48a, 48b are electrically coupled to control circuit 36. Control circuit 36 controls outputs of microwaves generated by magnetrons 48a, 48b, and the like. At this time, steam chamber 31, opening plate 44, loading table 34, food container body 39, and food container cover 40 are made of, for example, a polypropylene resin. A polypropylene resin withstands heat of steam, and is less likely to absorb microwaves. Therefore, food products 2a, 2b can be efficiently microwave-heated.

The heating cooker according to this exemplary embodiment is able to heat food products 2a, 2b with microwaves, in addition to steam and hot water generated by the steam and hot water generating device 14.

The heating cooker according to this exemplary embodiment is configured as described above.

An operation and an effect of the heating cooker configured as described above will now be described with reference FIG. 7, FIG. 8 and FIG. 13, and using FIG. 14 to FIG. 16.

Figure 14:
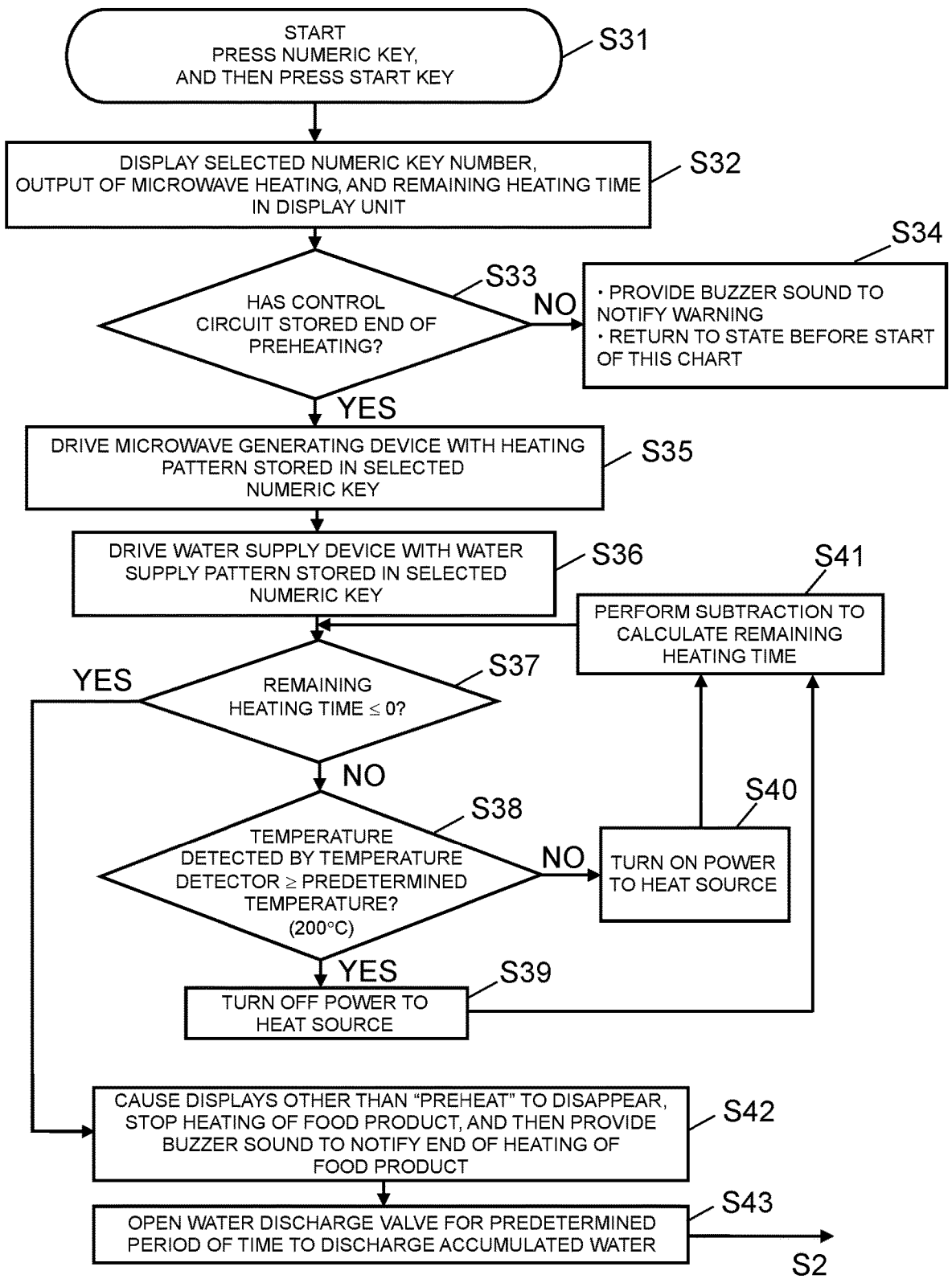
FIG. 14 is a flowchart illustrating a content of a heating control performed by the heating cooker according to the second exemplary embodiment.
Figure 15:
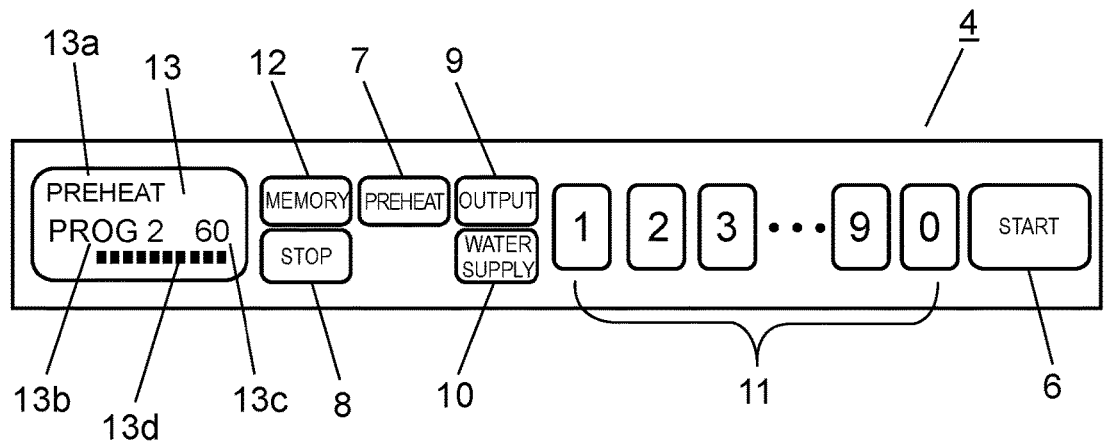
FIG. 15 is a view illustrating an example display, during heating, of an operating unit of the heating cooker according to the second exemplary embodiment.

FIG. 14 is a flowchart illustrating a content of a heating control performed by the heating cooker. FIG. 15 is a view illustrating an example display, during heating, of an operating unit of the heating cooker. FIG. 16 shows a graph illustrating a water supply pattern for use in the heating cooker. The flowchart shown in FIG. 14 is basically the same as the flowchart shown in FIG. 8.

First, since an operation of preheating temperature raising unit 16 of steam and hot water generating device 14 to a predetermined temperature (for example, 200° C.) is the same as the operation of the first exemplary embodiment illustrated with the flowchart shown in FIG. 7, a description thereof is omitted.

Next, after temperature raising unit 16 has been preheated in accordance with the flowchart shown in FIG. 7, in a state where a temperature of temperature raising unit 16 is kept around the predetermined temperature, a user opens the door of cooking chamber 3. The user then puts food products 2a, 2b such as frozen meat buns in food container 38, and disposes food container 38 in cooking chamber 3. At this time, as shown in FIG. 13, the user should dispose food container 38 so that protrusion 42 of food container body 39 and recess 45 of opening plate 44 fit each other, and then close the door.

Next, in accordance with the flowchart shown in FIG. 14, for example, the heating cooker starts heating of food container 38 accommodating food products 2a, 2b.

Specifically, as shown in FIG. 14, firstly, the user presses one of numeric keys 11, each storing a heating pattern which is appropriate for heating food products 2a, 2b in food container 38. The user then presses start key 6 (step S31). Thus, a heating operation for food products 2a, 2b starts.

In this exemplary embodiment, a case where food products 2a, 2b are frozen meat buns will be described. In addition, in this exemplary embodiment, microwave heating is performed, in addition to steam and hot water heating.

Therefore, the user presses one of numeric keys 11, for example, number "2", in which a heating pattern appropriate for meat buns is stored. At this time, control circuit 36 causes display unit 13 of operating unit 4 to display the selected numeric key 11, which is number "2," an output of microwave heating, and a remaining time required for heating (step S32).

Next, control circuit 36 determines whether end of preheating of temperature raising unit 16 has been stored (step S33). At this time, if end of preheating is not stored (NO in step S33), even though start key 6 is pressed, no subsequent operation starts. Therefore, control circuit 36 provides a warning buzzer sound to warn the user, and ends a heating process (step S34). As described above, in order to store a heating pattern in each of numeric keys 11 beforehand, memory key 12, output key 9, water supply key 10, numeric keys 11, and the like on operating unit 4 are used to store the heating pattern in a storage (not shown) of control circuit 36 with a predetermined algorithm.

In a state where temperature raising unit 16 of steam and hot water generating device 14 has been preheated, when the user presses one of numeric keys 11, for example, number "2", to select a heating pattern appropriate for food container 38 accommodating food products 2a, 2b that are frozen meat buns, and then presses start key 6, a heating operation starts. At this time, display unit 13 of operating unit 4 displays, as shown in FIG. 15, display 13b of "PROG 2" showing the heating pattern that is being operated, display 13c of "60" showing the remaining heating time in seconds, and display 13d of "level meter display" showing the output of microwave heating.

On the other hand, when end of preheating has been stored (YES in step S33), control circuit 36 drives microwave generating devices 47a, 47b. At this time, microwave generating devices 47a, 47b are driven with a corresponding heating pattern stored to the selected one of numeric keys 11, which is number "2." In this exemplary embodiment, as display 13d of "level meter display," for example, a microwave output display of 1800 W is shown with ten dots. Display 13d of "level meter display" is thus displayed as shown in FIG. 15.

Figure 16:
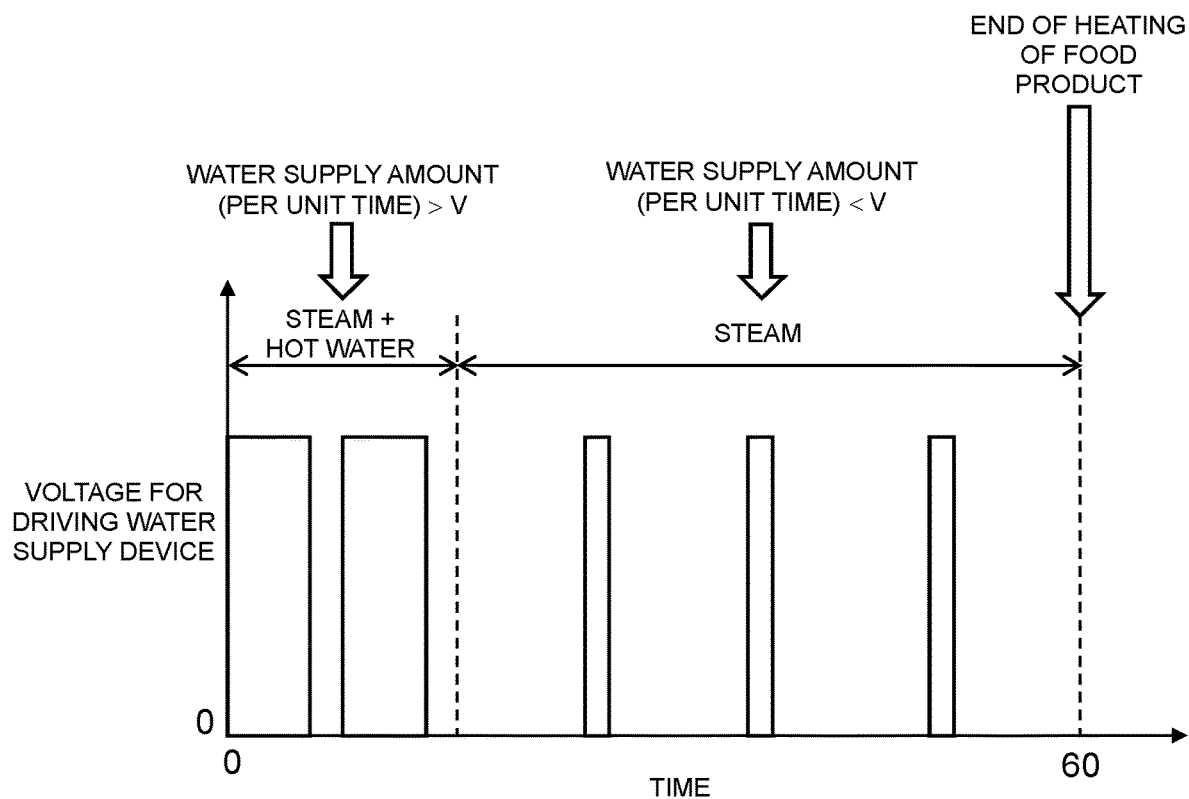
FIG. 16 shows a graph illustrating a water supply pattern for use in the heating cooker according to the second exemplary embodiment.

Next, simultaneously with microwave heating, control circuit 36 drives water supply device 26 with a water supply pattern, shown in FIG. 16, corresponding to the heating pattern selected with the one of numeric keys 11, which is number "2" (step S36). In this case, as described in the first exemplary embodiment with reference to FIG. 10, when water in predetermined amount V (per unit time) is supplied to temperature raising unit 16, steam and hot water are generated. On the other hand, when water in an amount less than predetermined amount V (per unit time) is supplied to temperature raising unit 16, only steam is generated.

An operation and an effect of the above water supply pattern will now be described with reference to FIG. 16.

In other words, when water is supplied with a water supply pattern shown in FIG. 16, in an initial stage of heating, firstly, water in an amount equal to or more than predetermined amount V (per unit time) is supplied to temperature raising unit 16. Thus, a large amount of steam is instantaneously generated, and hot water adhered to temperature raising unit 16 also rises along with the steam. At this time, a large amount of heat accumulated in temperature raising unit 16 through preheating is transmitted to the steam and hot water. Steam and hot water generating chamber 24 is internally filled with steam and hot water, and steam pressure in steam and hot water generating chamber 24 increases. Due to the increased steam pressure, the steam and hot water passed through steam hole 20, relay tube 30, and steam chamber 31 are instantaneously ejected from steam and hot water discharging ports 5 of opening plate 44. The steam and hot water ejected and passed through the plurality of opening holes 43 are filled, as described in the second exemplary embodiment, in food container 38 accommodating food products 2a, 2b. Thus, food products 2a, 2b accommodated in food container 38 can be efficiently heated.

In addition, a mixture of the steam and hot water has a large amount of heat. Therefore, in the initial stage of heating, the mixture facilitates defrosting of still frozen food products 2a, 2b. Thus, a time for heating food products 2a, 2b can remarkably be shortened.

At this time, in this exemplary embodiment, control circuit 36 drives magnetrons 48a, 48b of microwave generating devices 47a, 47b. Therefore, microwaves output into cooking chamber 3 further accelerate defrosting and heating of food products 2a, 2b. Generally, in terms of a heating capability, microwaves more easily heat water than ice. However, when steam and hot water supplied by steam and hot water generating device 14 hit frozen food products 2a, 2b, water instantaneously condenses on surfaces of food products 2a, 2b. The condensed water efficiently absorbs microwaves. Therefore, heating of food products 2a, 2b is facilitated. Thus, even frozen food products 2a, 2b can be heated in an improved manner.

In addition, the steam filled in food container 38 changes a dielectric constant in the space. Thus, a wavelength of microwaves entering into food container 38 shortens. Thus, an effect of reducing unevenness in heating of food products 2a, 2b can be obtained.

In other words, in this exemplary embodiment, in an initial stage of heating, by heating food products 2a, 2b in food container 38 with microwaves, in addition to steam and hot water, a heating capability (including shortened heating time and reduction in heating unevenness) can be remarkably improved.

On the other hand, in stages other than the initial stage of heating, as shown in FIG. 16, control circuit 36 controls power to water supply device 26 so that a water supply pattern in which a water supply amount is less than predetermined amount V (per unit time) is achieved. Thus, temperature raising unit 16 generates only steam and supplies the steam into food container 38. Simultaneously, microwaves are used to heat food products 2a, 2b. Thus, defrosted food products 2a, 2b are heated with steam and microwaves. As a result, food products 2a, 2b can be well steamed in a shorter heating time. Food products 2a, 2b can be well cooked because, firstly, in the initial stage of heating, a large amount of moisture supplied onto food products 2a, 2b for an improved defrosting capability evaporates and reduces through microwave heating. Thus, stickiness, which is caused by moisture remaining on the surfaces of food products 2a, 2b, can be reduced. As a result, food products 2a, 2b can be well cooked.

Heating of the food products is executed as described above.

Next, as shown in FIG. 14, control circuit 36 determines whether the remaining heating time is 0 (step S37). If the remaining heating time is not 0 (NO in step S37), control circuit 36 determines whether a temperature detected by temperature detector 21 is equal to or higher than a predetermined temperature (for example, 200° C.) (step S38). When the detected temperature is lower than the predetermined temperature (NO in step S38), control circuit 36 turns on power to heat sources 15a, 15b (step S40). Control circuit 36 then performs subtraction to calculate the remaining heating time (step S41), and executes step S37 and subsequent steps.

On the other hand, when the temperature detected by temperature detector 21 reaches the predetermined temperature (YES in step S38), control circuit 36 turns off power to heat sources 15a, 15b (step S39). Control circuit 36 then performs subtraction to calculate the remaining heating time (step S41). In other words, until the remaining heating time becomes 0, the heating cooker repeats operations of the power off (step S39) and the power on (step S40) described above, each time while performing subtraction to the remaining time (step S41). At this time, control circuit 36 causes display 13c of operating unit 4 to display the remaining time obtained through subtraction, as the heating time passes by. When the remaining heating time reaches 0 (YES in step S37), control circuit 36 causes display 13b of "PROG 2," display 13c of the remaining heating time, and display 13d of "level meter display" showing the output of microwave heating, other than "PREHEAT," to disappear from display unit 13. Simultaneously, control circuit 36 ends heating of food products 2a, 2b, and provides a buzzer sound to notify the end of heating of food products 2a, 2b (step S42). Thus, control circuit 36 notifies to the user that food products 2a, 2b have been heated.

Normally, after food 2a, 2b products have been heated, temperature raising unit 16 of steam and hot water generating device 14 is kept preheated to the predetermined temperature (approximately 200° C.) for next food products 2a, 2b heating.

In step S42, after food products 2a, 2b have been heated, similarly to step S21 in the second exemplary embodiment, control circuit 36 causes water discharge valve 28 to open for a predetermined period of time to discharge hot water accumulated, during heating, in reservoir 17 of steam and hot water generating device 14 (step S43). Water discharge valve 28 should be open only for a predetermined period of time after food products 2a, 2b have been heated. Therefore, except for the above period of time, water discharge valve 28 is always closed. Thus, if water to be used contains scale components, the scale components will condense into and drain away together with water accumulated in reservoir 17. Therefore, scale components are less likely to accumulate in steam and hot water generating chamber 24. As a result, water discharge hole 18 can be prevented from clogging, and the inside of steam and hot water generating chamber 24 can be kept clean.

Next, when the water has been discharged in step S43, the process returns to step S2 for preheating, and waits for next food products 2a, 2b heating.

At this time, in order to end a preheating operation for temperature raising unit 16 at the time when the water has been discharged in step S43, a user presses preheat key 7 on operating unit 4, and then immediately press (for example, within two seconds) the stop key. Thus, display 13a of "PREHEAT" disappears from display unit 13 of operating unit 4, and preheating stops. A series of heating operations performed by the heating cooker then ends.

As described above, based on a heating pattern of the microwave generating device 14 and a predetermined water supply pattern of the water supply device, corresponding food products 2a, 2b heating is executed.

In the above exemplary embodiment, a configuration is exemplified, in which food products are accommodated in food container 38 for heating. However, the present invention is not limited thereto. Top faces of loading table 34 and opening plate 44 according to the exemplary embodiments are configured in an approximately flat surface (including flat surface). Therefore, the heating cooker may be used as an ordinary microwave oven by disposing food products 2a, 2b such as a packed lunch on loading table 34 or opening plate 44 for microwave heating. Thus, a more convenient heating cooker can be provided.

In addition, a configuration may be adopted, in which a food product, which is different from food products 2a, 2b in food container 38 heated with steam, hot water, and microwaves, may be accommodated in another food container and heated with only microwaves. In other words, the other food container, different from food container 38, accommodating the different food product may be disposed on the top face of food container cover 40 of food container 38 for microwave heating, for example. Thus, the other food product can be heated simultaneously with food products 2a, 2b in food container 38. For example, a meat bun accommodated in food container 38 and Chinese soup accommodated in another food container can simultaneously be heated. In addition, ingredients and sauce to be served together with food products 2a, 2b can be simultaneously heated with food products 2a, 2b accommodated in food container 38. As a result, a more convenient heating cooker can be provided.

In addition, in the above exemplary embodiment, steam chamber 31, loading table 34, and opening plate 44 are configured to be detachable. Therefore, at the time of maintenance, the above components can easily be removed for cleaning. Furthermore, a configuration may be adopted, in which a height of a space in cooking chamber 3 can be extended by removing steam chamber 31, loading table 34, and opening plate 44 from cooking chamber 3. Thus, similarly to an ordinary microwave oven, a taller food product can be heated with only microwaves.

In addition, in the above exemplary embodiment, in an initial stage of heating, firstly, water is supplied at an amount equal to or more than predetermined amount V (per unit time) for heating with microwaves and a mixture of steam and hot water. Thereafter, the water supply amount is reduced than predetermined amount V (per unit time) for heating with steam and microwaves. However, the present invention is not limited thereto. For example, heating with microwaves and a mixture of steam and hot water is performed only in an initial stage of heating. Thereafter, the water supply amount may be significantly reduced than predetermined amount V (per unit time), that is, no water is supplied for heating with only microwaves. Thus, in an initial stage of heating, a large amount of moisture supplied on food products 2a, 2b to improve a defrosting capability can easily evaporate through microwave heating. As a result, by reducing an amount of water to be supplied on food products 2a, 2b, stickiness, which is caused by moisture remaining on a surface of food products 2a, 2b, can be further reduced.

In addition, in the above exemplary embodiment, a configuration is exemplified, in which microwave generating devices 47a, 47b are provided above and below cooking chamber 3. However, a configuration may be adopted, in which a microwave generating device 47a, 47b is provided either above or below cooking chamber 3.

In addition, in the above exemplary embodiment, food products 2a, 2b accommodated in food container 38 is heated. However, the present invention is not limited thereto. For example, similarly to the first exemplary embodiment, food products 2a, 2b may be directly disposed on opening plate 44 for heating.

The heating cooker according to this exemplary embodiment is achieved as described above.

In the first to third exemplary embodiments, configurations are exemplified, in which water is dropped from above onto temperature raising unit 16 of steam and hot water generating device 14 to generate steam and hot water. However, the present invention is not limited thereto. For example, a configuration may be adopted, in which water is supplied in a horizontal direction onto temperature raising unit 16, and a configuration and a direction toward which water is supplied to temperature raising unit 16 may be arbitrary. In other words, a configuration may be arbitrary as long as a similar effect is obtained, by allowing water in an amount equal to or more than predetermined amount V (per unit time) to be supplied onto temperature raising unit 16 to generate steam and hot water.

In addition, in the first to third exemplary embodiments, two frozen meat buns are used as food products 2a, 2b. However, the present invention is not limited thereto. For example, food products 2a, 2b may be either frozen or refrigerated. In addition, a quantity and a type of food products 2a, 2b (for example, noodles and rice food products) may not be specifically limited. Food container 38 may be preferably used to heat food products 2a, 2b such as noodles and rice food products that easily come apart. Thus, food products 2a, 2b can easily be handled in a convenient manner. Furthermore, when round-shaped food container 38 packed with noodles or a rice food product is microwave heated, food container 38 has no corners where microwaves are normally likely to concentrate. Therefore, a uniform food heating distribution can be achieved with microwaves. As a result, food products 2a, 2b can evenly be heated.

In addition, in the first to third exemplary embodiments, configurations are exemplified, in which steam and hot water discharging ports 5 are provided under food products 2a, 2b. However, the present invention is not limited thereto. For example, steam and hot water discharging ports 5 may be provided above food products 2a, 2b. In other words, as long as steam and hot water are supplied onto food products 2a, 2b, steam and hot water discharging ports 5 may be disposed at a desired position.

In addition, in the first to third exemplary embodiments, configurations are exemplified, in which a heating pattern and a water supply pattern stored beforehand are used to heat food products 2a, 2b with a mixture of steam and hot water. However, the present invention is not limited thereto. For example, as long as a configuration is adopted, in which at least a mixture of steam and hot water is used to heat food products 2a, 2b, a heating pattern or a water supply pattern may not be particularly used for heating.

In addition, in the second and third exemplary embodiments, round-shaped food container 38 is used. However, the present invention is not limited thereto. A shape of a food container may be, for example, an oval shape or a rectangular shape in plan view. Furthermore, a food container which keeps its shape for accommodating food products 2a, 2b is exemplified. However, the present invention is not limited thereto. As long as food products 2a, 2b can be accommodated and wrapped, a bag may be used, for example. In short, as long as an opening hole is provided, a desired food container may be used for accommodating food products 2a, 2b. At this time, in addition to resins, a desired wrapping material, such as paper and rubber, may be used for accommodating or wrapping food products 2a, 2b, as long as the material withstands heat of steam and hot water.

In addition, in the second and third exemplary embodiments, configurations are exemplified, in which opening holes 43 are provided only on bottom face 41 of food container 38. However, the present invention is not limited thereto. For example, as long as steam and hot water can be supplied from steam and hot water discharging ports 5, opening holes 43 may be provided at desired positions on food container 38.

In addition, in the first to third exemplary embodiments, configurations are exemplified, in which steam and hot water are supplied from steam and hot water generating device 14, through communication channel 35 provided with relay tube 30 and steam chamber 31, to steam and hot water discharging ports 5. However, the present invention is not limited thereto. As to a configuration of a communication channel, a communication channel may be formed only by a relay tube, for example. Furthermore, a single component or a plurality of components may be used to form a communication channel continuous from steam and hot water generating device 14 to steam and hot water discharging ports 5. In short, as long as steam and hot water can be supplied to food products 2a, 2b, a desired configuration may be adopted.

In addition, in the first to third exemplary embodiments, configurations are exemplified, in which, to adjust a water supply amount per unit time, an electric pump constituting water supply device 26 is driven by altering ON, OFF frequencies of a drive voltage. However, the present invention is not limited thereto. For example, a configuration may be adopted, in which an electric pump is driven by adjusting (increasing and decreasing) a drive voltage to adjust a water supply amount.

In addition, in the first to third exemplary embodiments, configurations are exemplified, in which, when food products 2a, 2b have been heated, control circuit 36 causes water discharge valve 28 to open for a predetermined period of time to discharge hot water, which is accumulated in reservoir 17 during heating. However, the present invention is not limited thereto. For example, a configuration may be adopted, in which water discharge valve 28 is open for a predetermined period of time for discharging while food products 2a, 2b are being heated. In short, a desired configuration may be adopted as long as water accumulated in reservoir 17 can be discharged.

As described above, the heating cooker according to the present invention includes a body, a steam and hot water discharging port provided on the body, a steam and hot water generating device for generating steam and hot water with a heat source, a water supply device for supplying water to a steam and hot water generating device, a communication channel having one end coupled with the steam and hot water generating device and another end coupled with the steam and hot water discharging port, and a control circuit for controlling operations of the heat source and the water supply device. The steam and hot water generating device includes the steam and hot water generating chamber, a temperature raising unit provided in the steam and hot water generating chamber, and a temperature detector for detecting a temperature of the temperature raising unit. The control circuit drives, based on a signal detected by the temperature detector, the heat source to preheat the temperature raising unit so that the temperature raising unit is heated to a predetermined temperature, causes the temperature raising unit to generate a mixture of steam and hot water when the water supply device supplies water in an amount equal to or more than a predetermined amount per unit time, and causes the temperature raising unit to generate only steam when the water supply device supplies water in an amount less than the predetermined amount per unit time. The control circuit may perform a control, in accordance with a state of a food product, such that a mixture of steam and hot water or only steam supplied from the steam and hot water discharging port hits and heats the food product.

According to this configuration, the temperature raising unit is preheated to the predetermined temperature. Therefore, when water is supplied, the temperature raising unit instantaneously generates steam, and the steam is discharged from the steam and hot water generating chamber. The steam discharged and passed through the communication channel comes out of the steam and hot water discharging port, and hits the food product. Thus, the food product can be heated and cooked. At this time, when water is supplied to the temperature raising unit in an amount equal to or more than a predetermined amount (per unit time), steam and hot water that is a previous state of steam are mixed inside the steam and hot water generating chamber. A mixture of steam and hot water receives a large amount of heat from the temperature raising unit. At this time, steam pressure in the steam and hot water generating chamber quickly increases, and the mixture of steam and hot water vigorously ejects from the steam and hot water generating chamber. The ejected mixture of steam and hot water flows into the communication channel, comes out of the steam and hot water discharging port, and hits the food product. As a result, the food product can effectively be heated and cooked.

In other words, the heating cooker in this configuration is capable of performing heat cooking with not only steam, but also with a mixture of steam and hot water, as required. Specifically, the mixture of steam and hot water effectively heats a frozen food product requiring a greater heating effort. Therefore, the food product can be heated in an accelerated manner to be cooked. In other words, to heat a frozen food product, hot water effectively defrosts a frozen portion. Simultaneously, steam also heats the food product. Thus, a time for heating the food product can be shortened. On the other hand, when an object to be heated that is a food product is in a refrigerated state, and requires a less heating effort, the temperature raising unit is supplied with water in an amount less than the predetermined amount (per unit time). Then, only steam is generated to hit the food product. Thus, the food product can be heated with reduced wateriness. As a result, the food product can be well cooked in an improved manner.

In addition, the control circuit of the heating cooker according to the present invention may perform a control such that, in at least an initial stage of heating of the food product, the water supply device supplies water in an amount equal to or more than a predetermined amount per unit time to the temperature raising unit, and a mixture of steam and hot water hits and heats the food product.

According to this configuration, for a frozen food product that requires a maximum heating effort in an initial stage of heating, water in an amount equal to or more than a predetermined amount (per unit time) is supplied to cause a mixture of steam and hot water to hit and heat the frozen food product. Thus, defrosting of the frozen food product can be facilitated to shorten a time for heating the food product. In addition, by reducing time for heating a food product in an initial stage of heating, a total heating time for fully heating the food product can be shortened. Furthermore, in a stage of finishing heating of the food product, the food product has been heated to alter its state from a frozen state to a refrigerated state. At that time, water in an amount less than the predetermined amount (per unit time) is supplied to the temperature raising unit to generate only steam, and to cause the steam to hit the food product. Thus, the food product can be well heated with reduced wateriness in an improved manner.

In addition, the heating cooker according to the present invention includes a food container that is accommodated in the body, the food container having an opening hole at a portion of an area for accommodating the food product. The opening hole may be provided at a position facing the steam and hot water discharging port, and the food product in the food container is heated with steam passed through the steam and hot water discharging port and supplied from the opening hole of the food container.

According to this configuration, steam and hot water can be supplied through the opening hole into the food container, to highly effectively heat the food product in the food container. In addition, without directly touching the food product, a user is able to perform a heating operation with the food container. Thus, an easy, sanitary heating process can be achieved.

In addition, the body of the heating cooker according to the present invention may include a cooking chamber. The cooking chamber may include a microwave generating device for generating microwaves, and the steam and hot water discharging port for supplying steam and hot water, and the food product accommodated in the cooking chamber may be heated with microwaves generated by the microwave generating device and steam and hot water generated by the steam and hot water generating device.

According to this configuration, a food product can be heated with steam, hot water, and microwaves, so that a time for heating the food product can be further shortened. Normally, in terms of a heating capability, microwaves more easily heat water than ice. Therefore, microwaves are less likely to efficiently heat a frozen food product. However, steam and hot water firstly heat a surface of the frozen food product. The steam and hot water instantaneously defrost the surface of the frozen food product so that moisture is generated on the surface of the food product. Microwaves then effectively act on the generated moisture, whereby water is efficiently heated. Thus, heating of the food product can further be facilitated.

In addition, the steam and hot water generating device of the heating cooker according to the present invention may include a reservoir for storing water at a position near the temperature raising unit, and a water discharge valve. The reservoir may be disposed in communication with the water discharge valve. The control circuit may perform a control such that the water discharge valve is open for a predetermined period of time to discharge water in the reservoir.

Normally, when water to be supplied to the temperature raising unit contains scale components, the scale components condense in water flowing from the temperature raising unit to the reservoir. However, according to this configuration, water condensed with scale components and accumulated in the steam and hot water generating device is discharged through the water discharge valve from the steam and hot water generating device. Thus, scale components are less likely to accumulate in the steam and hot water generating device.

INDUSTRIAL APPLICABILITY

The present invention is applicable to not only home heating cookers, but also heating cookers used in food factories, since even frozen food products requiring a greater heating effort can be promptly heated with steam and hot water.

What is claimed is:

1. A heating cooker comprising:
    a body;
    a cooking chamber being a separate enclosed cavity in which food product or an object is to be heated therein, wherein the cooking chamber is completely enclosed within the body;
    a steam and hot water discharging port provided at a bottom of the cooking chamber, such that the food product or the object in the cooking chamber is heated from beneath by steam which is discharged through the steam and hot water discharging port;
    a steam and hot water generating device for generating steam and hot water with a heat source;
    a water supply device for supplying water to the steam and hot water generating device;
    a communication channel having one end coupled with the steam and hot water generating device and another end coupled with the steam and hot water discharging port;
    a control circuit for controlling operations of the heat source and the water supply device,
    wherein the steam and hot water generating device includes a steam and hot water generating chamber, a temperature raising unit provided in the steam and hot water generating chamber, and a temperature detector for detecting a temperature of the temperature raising unit, and
    the control circuit:
        drives the heat source to preheat the temperature raising unit to a predetermined temperature,
        causes the temperature raising unit to generate a mixture of steam and hot water when the water supply device supplies water in an amount equal to or more than a predetermined amount per unit time, and
        causes the temperature raising unit to generate only steam when the water supply device supplies water in an amount less than the predetermined amount per unit time, and
    performs a control, in accordance with a state of a food product, such that a mixture of steam and hot water or only steam supplied from the steam and hot water discharging port hits and heats the food product; and
    wherein:
        the steam and hot water generating device includes a bottom portion and a top portion,
        the top portion includes a plurality of water supply holes and a steam hole,
        the bottom portion includes the temperature raising unit,
        the temperature raising unit is formed of an inclined plane inclining downward,
        the plurality of water supply holes are provided at positions facing a top of the inclined plane, and
        the steam hole is in communication with the steam and the hot water discharging port via the communication channel.

2. The heating cooker according to claim 1, wherein the control circuit performs a control such that, in at least an initial stage of heating of the food product, the water supply device supplies water in an amount equal to or more than the predetermined amount per unit time to the temperature raising unit, and a mixture of steam and hot water hits and heats the food product.

3. The heating cooker according to claim 1, further comprising a food container accommodated in the body, the food container having an opening hole at a portion of an area for accommodating the food product,
    wherein the opening hole is provided at a position facing the steam and hot water discharging port, and
    the food product in the food container is heated with steam passed through the steam and hot water discharging port and supplied from the opening hole of the food container.

4. The heating cooker according to claim 1, wherein the cooking chamber includes a microwave generating device for generating microwaves, and the steam and hot water discharging port for supplying steam and hot water, and
    the food product accommodated in the cooking chamber is heated with microwaves generated by the microwave generating device and steam generated by the steam and hot water generating device.

5. The heating cooker according to claim 1, wherein the steam and hot water generating device includes a reservoir for storing water at a position near the temperature raising unit, and a water discharge valve, the reservoir being disposed in communication with the water discharge valve, and
    the control circuit performs a control such that the water discharge valve is open for a predetermined period of time to discharge water in the reservoir.

* * * * *